(12) United States Patent
Hussain et al.

(10) Patent No.: US 7,016,987 B2
(45) Date of Patent: Mar. 21, 2006

(54) TRANSACTION ALIGNER MICROARCHITECTURE

(75) Inventors: Agha B. Hussain, Santa Clara, CA (US); Jiann Liao, Campbell, CA (US); Cesar A. Talledo, Sunnyvale, CA (US); Jeffrey Lukanc, San Jose, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 451 days.

(21) Appl. No.: 09/888,321

(22) Filed: Jun. 21, 2001

(65) Prior Publication Data

US 2003/0018837 A1    Jan. 23, 2003

(51) Int. Cl.
*G06F 13/28* (2006.01)
(52) U.S. Cl. ............................. 710/22; 710/33; 710/52
(58) Field of Classification Search .................... 710/1, 710/22, 33, 52, 54
See application file for complete search history.

(56) References Cited

U.S. PATENT DOCUMENTS

| | | | |
|---|---|---|---|
| 5,170,477 A | 12/1992 | Potter et al. | |
| 5,297,242 A * | 3/1994 | Miki ............................ | 710/22 |
| 5,392,406 A | 2/1995 | Peterson et al. | |
| 5,517,627 A * | 5/1996 | Petersen ..................... | 710/316 |
| 5,594,927 A | 1/1997 | Lee et al. | |
| 5,687,328 A | 11/1997 | Lee | |
| 5,737,761 A * | 4/1998 | Holland et al. ............. | 345/531 |
| 5,761,532 A * | 6/1998 | Yarch et al. ................. | 710/22 |
| 5,862,407 A | 1/1999 | Sriti | |
| 6,003,122 A * | 12/1999 | Yarch et al. ................ | 711/201 |
| 6,009,493 A * | 12/1999 | Fujiyama ...................... | 711/1 |
| 6,055,584 A * | 4/2000 | Bridges et al. .............. | 710/27 |
| 6,226,338 B1 * | 5/2001 | Earnest ....................... | 375/372 |
| 6,275,877 B1 * | 8/2001 | Duda ......................... | 710/23 |
| 6,412,048 B1 * | 6/2002 | Chauvel et al. ............. | 711/158 |
| 6,662,258 B1 * | 12/2003 | Lukanc et al. ............. | 710/308 |

OTHER PUBLICATIONS

The Ganssie Group, DMA, originally published in Embedded Systems Programming, Oct. 1994, pp. 1-6, http://www.ganssle.com/articles.adma.htm.*

* cited by examiner

*Primary Examiner*—Kim Huynh
*Assistant Examiner*—Eron J. Sorrell
(74) *Attorney, Agent, or Firm*—Bever, Hoffman & Harms

(57) ABSTRACT

A computer system is provided that includes a direct memory access (DMA) controller, a memory control device and a slave device, all coupled to a system bus. The DMA controller is configured to implement fly-by read and fly-by write operations between the memory control device and the slave device. The memory control device and the slave device each include read and write aligners. During a fly-by read, data is read from slave device and aligned to the system bus using a peripheral read aligner. The memory control device re-aligns the data received on the system bus using a write aligner and writes the data to a main memory. During a fly-by write, data is read from the main memory and aligned to the system bus using a read aligner in memory control device. A write aligner in the slave device then re-aligns the data received on the system bus.

36 Claims, 11 Drawing Sheets

DATA IN FIFO 114

| | 00 | 01 | 10 | 11 | 114 |
|---|---|---|---|---|---|
| 201 | x | x | A | B | |
| 202 | C | D | E | F | |
| 203 | G | H | I | J | |
| 204 | K | L | M | N | |
| 205 | O | P | Q | R | |
| 206 | S | T | U | V | |
| 207 | W | X | Y | Z | |

DATA ON SYSTEM BUS 105

| | 00 | 01 | 10 | 11 | 105 |
|---|---|---|---|---|---|
| 301 | A | B | C | D | |
| 302 | E | F | G | H | |
| 303 | I | J | K | L | |
| 304 | M | N | O | P | |
| 305 | Q | R | S | T | |
| 306 | U | V | W | X | |
| 307 | Y | Z | x | x | |

FIG. 4

DATA TO MEMORY 104

| | 00 | 01 | 10 | 11 | 104 |
|---|---|---|---|---|---|
| 401 | x | x | x | A | |
| 402 | B | C | D | E | |
| 403 | F | G | H | I | |
| 404 | J | K | L | M | |
| 405 | N | O | P | Q | |
| 406 | R | S | T | U | |
| 407 | V | W | X | Y | |
| 408 | Z | x | x | x | |

FIG. 5

FIG. 8  FLY-BY READ (SLAVE PERIPHERAL DEVICE 102)

FLY-BY READ (MEMORY CONTROL DEVICE 103)

FLY-BY WRITE (SLAVE PERIPHERAL DEVICE 102)

DATA IN MAIN MEMORY 104

| ADDR | 00 | 01 | 10 | 11 |
|---|---|---|---|---|
| A1 | x | A | B | C |
| A2 | D | E | F | G |
| A3 | H | I | J | K |
| A4 | L | M | N | O |
| A5 | P | Q | x | x |
| A6 | x | x | x | x |

FIG. 12

DATA, ADDRESS AND BYTE-ENABLES ON SYSTEM BUS 105

| ADDR | 00 | 01 | 10 | 11 | BE |
|---|---|---|---|---|---|
| A1 | x | x | x | x | 0000 |
| A1 | A | B | C | D | 1111 |
| A2 | E | F | G | H | 1111 |
| A3 | I | J | K | L | 1111 |
| A4 | M | N | O | P | 1111 |
| A5 | Q | x | x | x | 1000 |

FIG. 13

DATA AND BYTE ENABLES RECEIVED BY SLAVE PERIPHERAL 113

| 00 | 01 | 10 | 11 | BE |
|---|---|---|---|---|
| x | x | x | x | 0000 |
| x | x | x | A | 0001 |
| B | C | D | E | 1111 |
| F | G | H | I | 1111 |
| J | K | L | M | 1111 |
| N | O | P | Q | 1111 |

FIG. 14

FLY-BY WRITE (MEMORY CONTROL DEVICE 103)

TRANSACTION ALIGNER MICROARCHITECTURE

FIELD OF THE INVENTION

The present invention relates to a computer system architecture. More specifically, the present invention relates to an architecture for controlling the alignment of data and byte enables to achieve efficient data transfer between two devices in a computer system.

BACKGROUND OF THE INVENTION

A fly-by transaction is defined as a transaction that results in the transfer of data directly between two devices coupled to a system bus, without storing the data in an intermediate buffer. Fly-by transactions are typically performed under the control of a direct memory access (DMA) controller. For example, a fly-by read operation may involve reading a data word from a slave peripheral device, transmitting the data word on a system bus, receiving the data word with a memory control unit, and the writing the data word to a main memory device. However, alignment issues may exist during the fly-by transaction. Alignment issues are generally described below in connection with FIG. 1.

FIG. 1 is a block diagram of a memory system 1 that includes a first memory device 10, a system bus 20, an aligner 30 and a second memory device 40. The first memory device 10 includes multiple rows. Each row entry has four byte locations "00", "01", "10", and "11". Alignment in the first memory device 10 is defined with respect to byte location "00".

A first data word having four bytes "ABCD" and a second data word having four bytes "EFGH" are stored in the first memory device 10. The four bytes "ABCD" of the first data word are stored in byte locations "00", "01", "10" and "11", respectively, in the first row of first memory device 10. The four bytes "ABCD" of the data word are therefore aligned with the byte location "00" in the first memory device 10. In contrast, the four bytes "EFGH" of the second data word are stored in byte locations "10", "11", "00", and "01", respectively, in second and third rows of the first memory device 10. The four bytes "EFGH" of the second data word are therefore not aligned with byte location "00" in the first memory device 10.

Data words are read out of the first memory device 10 onto system bus 20. System bus 20 includes four byte lanes for routing a data word, wherein each byte lane routes one byte of the data word. These byte lanes are labeled "00", "01", "10", and "11" to correspond with the byte locations of the first memory device 10. Alignment of a word on system bus 20 is defined with respect to byte lane "00". Thus, data word "ABCD" is aligned with system bus 20, while data word "EFGH" is not aligned with system bus 20.

Aligner 30 is coupled to receive the data word provided on system bus 20. Aligner 30 aligns the data received on system bus 30 with one of the byte locations "00", "01", "10" and "11" in the second memory device 40. As illustrated in FIG. 1, aligner 30 aligns the data word "ABCD" with byte location "01" of the second memory device 40. Similarly, aligner 30 aligns the data word "EFGH" with byte location "11" of the second memory device 40. While aligner 30 is capable of aligning data to any byte location in the second memory device 40, the transmitted data may not be aligned with respect to system bus 20. Other systems have suggested the use of aligners at two ends of a bus to ensure that data on the bus is aligned. However, these systems are not optimized for fly-by read and fly-by write operations. Other systems have attempted to solve the alignment problems on system bus by transferring data on a byte-by-byte basis, or by placing other constraints on the transfer of data (i.e., the number of bytes transferred must be a multiple of four and data buffers must be word aligned). Thus, these systems have many limitations. Accordingly, it would be desirable to have a system that overcomes the deficiencies of the prior art.

SUMMARY

Accordingly, the present invention provides a system in which data can be efficiently transferred between any byte location in a slave peripheral memory and any byte location in a main memory, without any restriction. Data on the system bus is always aligned with a predetermined byte lane. The data transfer is fly-by, fully synchronous, and has a peak bandwidth of a word per clock cycle.

In a particular embodiment, a computer system includes a system bus and a direct memory access (DMA) controller, a memory control device and a slave device, all coupled to the system bus. The DMA controller is configured to implement fly-by read and fly-by write data transfer operations between the memory control device and the slave device.

The memory control device is coupled to the system bus. The memory control device includes a memory controller, a memory read aligner, a memory write aligner and a memory slave interface. The memory slave interface provides an interface to the system bus. The memory read aligner and the memory write aligner are coupled between the memory slave interface and the memory controller. The memory write aligner aligns data from the memory slave interface to the memory controller. The memory read aligner aligns data from the memory controller to the memory slave interface. The memory controller provides data to and from a main memory of the computer system.

The slave device is coupled to the system bus and the DMA controller. The slave device includes a slave peripheral, a peripheral read aligner, a peripheral write aligner, and a peripheral slave interface. The peripheral slave interface provides an interface to the system bus. The peripheral read aligner and the peripheral write aligner are coupled between the peripheral slave interface and the slave peripheral. The peripheral read aligner aligns data from a FIFO memory in the slave peripheral to the peripheral slave interface. The peripheral write aligner aligns data from the peripheral slave interface to the FIFO memory in the slave peripheral.

The computer system has aligners both at the memory control device and the slave peripheral. Although theoretically only one aligner is necessary to align data between two devices (see, FIG. 1), the present invention uses the rule that data on the system bus is always aligned to fill the lower byte lanes of the system bus. Thus, as data is transferred from the slave peripheral to the system bus, it is aligned to fill the lower byte lanes of the system bus. The same alignment is performed when data is transferred from the memory control device to the system bus. Although the computer system incurs the extra cost of one aligner in each device, instead of one aligner between two devices, the alignment rule defined above greatly simplifies the design of the DMA controller. The DMA controller controls the byte address in the main memory where the data will be transferred to/from, as well as the number of bytes transferred between the slave peripheral device and the main memory, and is therefore in charge of placing byte enable information on the system bus. The byte enable information identifies which data bytes of a data word transferred over the system bus are valid. Because the data bytes on the system bus are always aligned to the lower byte lanes, the DMA controller does not need to know how data is aligned in the slave peripheral device or the main memory. The DMA controller can simply assume that data will fill the lower byte lanes of the system bus first.

During a fly-by read operation, the peripheral read aligner receives data from the FIFO memory of the slave peripheral, along with an alignment signal provided by the slave peripheral. Data is read from the peripheral FIFO memory and aligned to the system bus using the peripheral read aligner. The memory write aligner in the memory control device receives this aligned data from the system bus (via the memory slave interface), along with an alignment signal provided on the system bus by the DMA controller. The alignment signal corresponds with the two least significant bits of the destination data address (i.e., the byte address) in the main memory. In response, the memory write aligner aligns the data received on the system bus to a byte location in the main memory corresponding with the alignment signal.

Also during a fly-by read operation, the DMA controller provides byte enable signals on the system bus. These byte enable signals are passed through the slave interface and peripheral write aligner to the slave peripheral, such that the slave peripheral is able to keep track of the number of bytes actually transferred during the fly-by read operation. This information enables the slave peripheral to accurately adjust the read pointer of its FIFO memory at the end of the fly-by read operation.

Also, at the end of a fly-by read operation, the DMA controller may provide an address along with a logic zero byte enable signal, thereby flushing the last data bytes of the fly-by read operation from the memory write aligner.

During a fly-by write operation, data is read from the main memory and aligned to the system bus using the memory read aligner. This alignment is performed in response to an alignment signal provided by the DMA controller on the system bus. The alignment signal corresponds with the two least significant bits of the source data address (i.e., the byte address) in the main memory. If the alignment signal indicates that the data read from the main memory is not originally aligned with the system bus, then DMA controller will provide a logic zero byte enable signal on the system bus during the initial fly-by write cycle, such that the first word placed on the system bus is ignored by the slave device. The peripheral write aligner receives the aligned data from the system bus (via the peripheral slave interface), along with an alignment signal provided by the slave peripheral. In response, the peripheral write aligner aligns the data received on the system bus to a byte location in the FIFO memory corresponding with the alignment signal.

In a particular embodiment, each of the aligners includes: (1) a barrel shifter coupled to receive a data word, a byte enable value and an alignment signal, (2) a register coupled to receive a data word and a byte enable value provided by the barrel shifter, and (3) an output multiplexer coupled to receive the data words and byte enable values provided by the barrel shifter and the register, the output multiplexer being controlled by the alignment signal.

Each register can include: (1) a data register for storing a data word provided by the barrel shifter, (2) a byte enable register for storing a byte enable value provided by the barrel shifter, and (3) means for clearing the byte enable register.

Each aligner can further include: (1) means for preloading the register with a data word and byte enable value provided by the barrel shifter, (2) means for loading the register with a data word and byte enable value provided by the barrel shifter, (3) means for preserving a data word and a byte enable value in the register, and (4) means for bypassing the barrel shifter and the register.

The present invention will be more fully understood in view of the following description and drawings.

BRIEF DESCRIPTION OF THE DRAWINGS

FIG. 3 is a block diagram illustrating a portion of a FIFO in accordance with one embodiment of the present invention.

FIG. 4 is a block diagram illustrating the fully aligned manner in which the data bytes are routed on a system bus in accordance with one embodiment of the present invention.

FIG. 5 is a block diagram illustrating one possible re-alignment performed by a memory write aligner of the present invention.

FIGS. 12, 13 and 14 are block diagrams illustrating the contents of a main memory, the address, data and byte-enable signals on a system bus, and the data and byte enables received by a slave peripheral, respectively.

DETAILED DESCRIPTION

Figure 1:
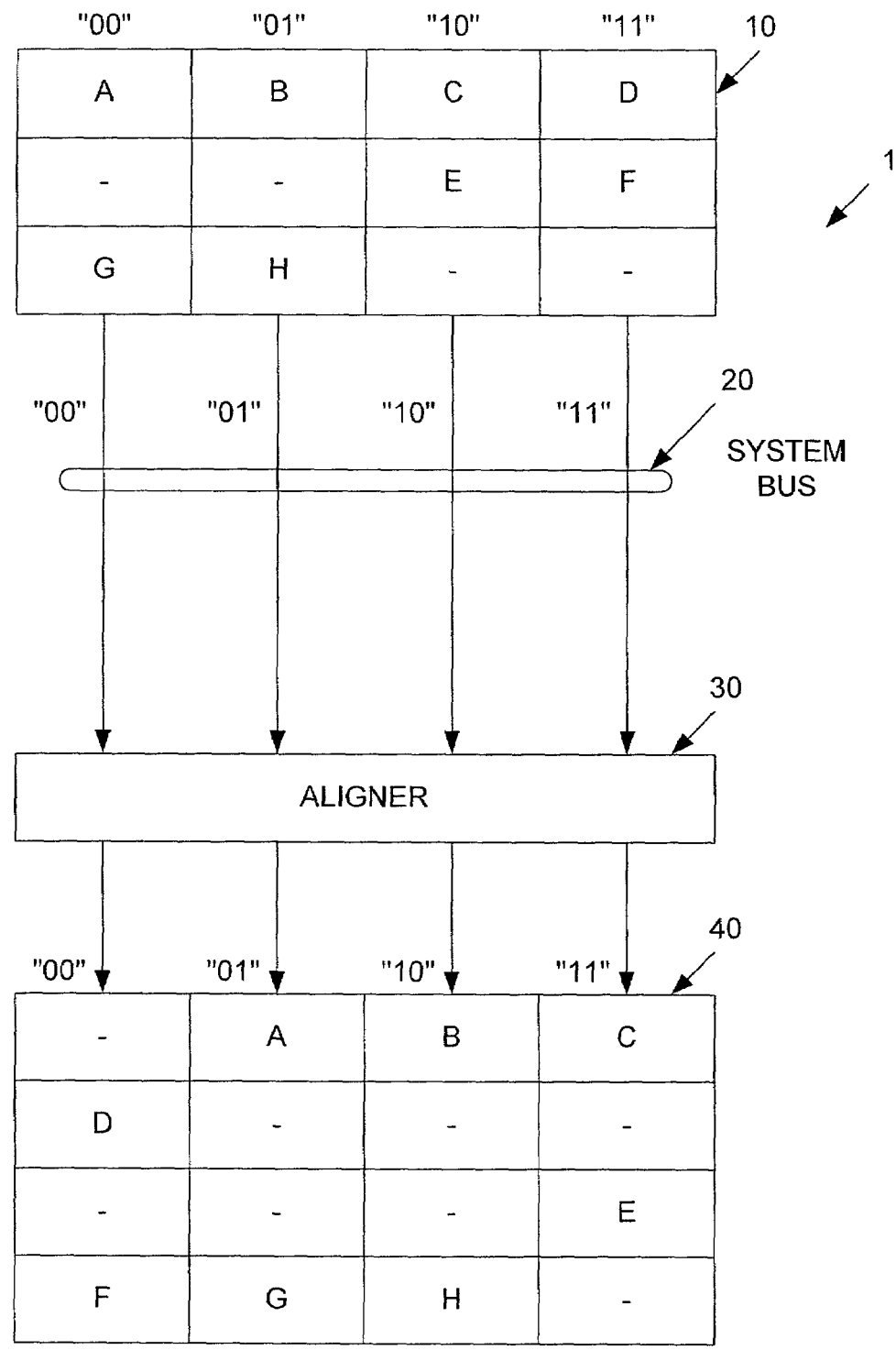
FIG. 1 is a block diagram of a conventional memory system that includes a first memory device, a system bus, an aligner and a second memory device.
Figure 2:
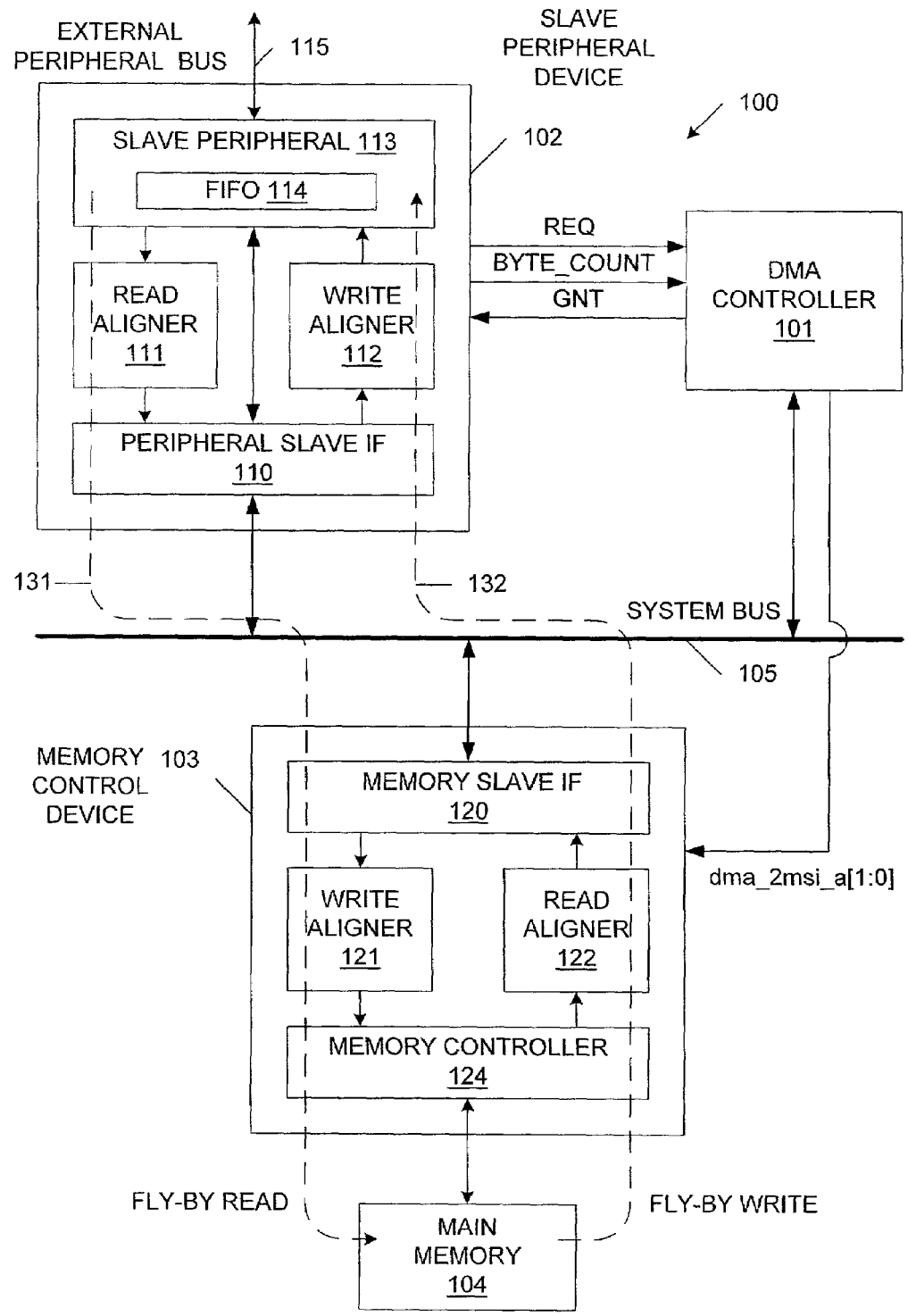
FIG. 2 is a block diagram of a computer system in accordance with one embodiment of the present invention.

FIG. 2 is a block diagram of a computer system 100 in accordance with one embodiment of the present invention. Computer system 100 includes DMA controller 101, slave peripheral device 102, memory control device 103, main memory 104 and system bus 105. A CPU (not shown) is also coupled to system bus 105. In accordance with one embodiment, computer system 100 is a system-on-a-chip.

Slave peripheral device 102 includes peripheral slave interface 110, peripheral read aligner 111, peripheral write transaction aligner 112 and slave peripheral 113. Slave peripheral 113 includes FIFO memory 114. FIFO memory 114 receives and stores data provided on an external peripheral bus 115. In the described embodiment, each entry of FIFO 114 is a data word that includes four 8-bit bytes. It is understood that in other embodiments, FIFO 114 can store words of other widths.

FIG. 3 is a block diagram illustrating a portion of FIFO 114 in accordance with the present embodiment. The illustrated portion of FIFO 114 includes seven 32-bit entries 201–207. Each of these entries 201–207 is capable of storing four 8-bit bytes, or one data word. In the described examples, FIFO 114 stores 8-bit data bytes A and B at locations "10" and "11" of FIFO entry 201. Meaningless entries, represented by the symbol "x" are stored at locations "00" and "01" of FIFO entry 201. FIFO entries 202–207 store data words "CDEF", "GHIJ", "KLMN", "OPQR", "STUV", and "WXYZ", respectively.

FIFO 114 is configured to provide data words and alignment control signals to peripheral read aligner 111. In response, peripheral read aligner 111 routes the data bytes A–Z in a fully aligned manner through slave interface 110 to system bus 105.

FIG. 4 illustrates the fully aligned manner in which the data bytes A–Z are routed on system bus 105. The first two bytes A and B are shifted to the "00" and "01" byte locations of the first data word 301 (i.e., from a higher byte position to a lower byte position). The next two bytes C and D are shifted to the "10" and "11" byte locations of the first data word 301. As a result, the first data word "ABCD" transmitted on system bus 105 does not include any irrelevant bytes, and is aligned with the "00" byte location. All subsequent data words in the transfer will also be fully aligned with the "00" byte location. Note that the last word of the transfer may not be a full word (e.g., YZxx). The manner in which the data words are aligned and transmitted to system bus 105 is described in more detail below.

Returning now to FIG. 2, peripheral write aligner 112 is configured to receive fully aligned data words from system bus 105 through peripheral slave interface 110. Write aligner 112 is controlled by slave peripheral 113 to provide data words to FIFO 114 that may be aligned on any one of the four byte locations within FIFO 114. Peripheral write aligner 112 is described in more detail below.

Turning now to memory control device 103, main memory 104 stores data for computer system 100. In the described embodiment, main memory 104 stores data in the same format as FIFO 114. That is, main memory 104 includes entries that store data words having four 8-bit bytes.

Main memory 104 is configured to provide data words to memory controller 124. Memory controller 124, in turn, provides the data words to memory read transaction aligner 122. DMA controller 101 provides an alignment signal to memory slave interface 120 on system bus 105. This alignment signal corresponds with the two least significant bits of the source data address (i.e., the byte address) in main memory 104. Memory slave interface 120 provides this alignment signal to memory controller 124 and memory read aligner 122. In response, memory read aligner 122 routes data bytes in a fully aligned manner through memory slave interface 120 to system bus 105. The manner in which the data bytes are aligned and transmitted to the system bus 105 is described in more detail below.

Memory write transaction aligner 121 is configured to receive fully aligned data words from system bus 105 through memory slave interface 120. Memory write aligner 121 is controlled by an alignment signal provided by DMA controller 101 through system bus 105 and memory slave interface 120. This alignment signal corresponds with the two least significant bits of the destination data address (i.e., the byte address) in the main memory. In response to this alignment signal, memory write aligner 121 is controlled to provide data words to memory controller 124, such that the data words may be aligned on any one of the four byte locations in main memory 104.

FIG. 5 is a block diagram that illustrates one possible re-alignment performed by memory write aligner 121. In the example of FIG. 5, write aligner 121 is controlled to shift the fully aligned data words 301–307 received from system bus 105, thereby creating data words 401–408. Data words 401–408 are aligned starting with the "11" byte location as illustrated in FIG. 5. Memory controller 124 provides the re-aligned data words 401–408 to main memory 104. Byte enable signals having values of "0001" will be provided when writing data word 401 to main memory 104, such that only data byte "A" is written (and bytes 00, 01 and 10 of main memory 104 are not disturbed). Memory write aligner 121 is described in more detail below.

DMA controller 101 controls the transfer of data between slave device 102 and memory control device 103, without involving a CPU (not shown) coupled to system bus 105. In general, DMA controller 101 can initiate either a fly-by read operation or a fly-by write operation between slave device 102 and memory control device 103.

In a fly-by read operation, data is read from FIFO 114, aligned by peripheral read aligner 111, and transferred to system bus 105 through peripheral slave interface 110. The fully-aligned data on system bus 105 is then transferred to memory write aligner 121 through memory slave interface 120. Memory write aligner 121 then re-aligns the data, if required by DMA controller 101. The re-aligned data is provided to main memory 104 through memory controller 124. The path of the fly-by read operation is illustrated by dashed line 131 in FIG. 2.

In a fly-by write operation, data is read from main memory 104 and provided to memory read aligner 122 through memory controller 124. Memory read aligner 122 fully aligns the data and transmits this aligned data to system bus 105 through memory slave interface 120. The data on system bus 105 is then transferred to peripheral write aligner 112 through peripheral slave interface 110. Peripheral write aligner 112 then re-aligns the data, if required by slave peripheral 113, and writes this data to FIFO 114. The path of the fly-by write operation is illustrated by dashed line 132.

As described in more detail below, peripheral transaction aligners 111 and 112 are able to (1) pre-load slave peripheral data, align data going to system bus 105, and not align byte-enables to slave peripheral 113 during fly-by reads, (2) align data and byte-enables going to slave peripheral 113 during fly-by writes, and (3) be bypassed during CPU reads and writes. In addition, aligners 111–112 are configured to handle complications that arise from the interaction of peripheral slave interface 110 and slave peripheral 113.

Similarly, as described in more detail below, memory transaction aligners 121 and 122 are able to (1) align data and byte-enables going to main memory 104 during fly-by reads, (2) align data going to system bus 105 during fly-by writes and (3) be bypassed during CPU reads and writes. In addition, aligners 121–122 are configured to handle complications that arise from the interaction of memory slave interface 120 and memory controller 124.

Aligners 111–112 and 121–122 are further configured to handle complications arising from interactions with system bus 105 (e.g., wait cycles in a transfer).

Figure 6:
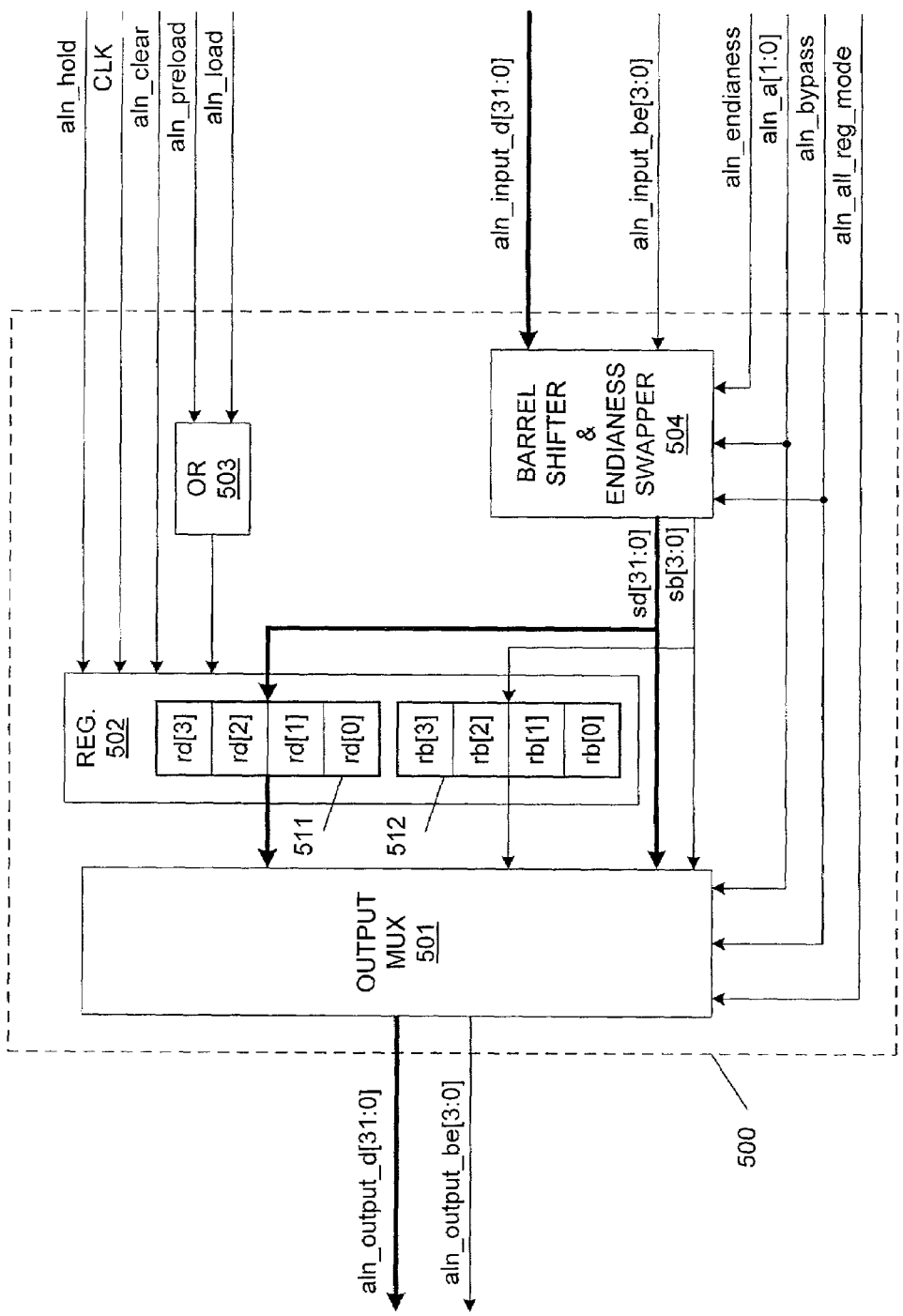
FIG. 6 is a block diagram of a generic transaction aligner in accordance with one embodiment of the present invention.
Figure 9:
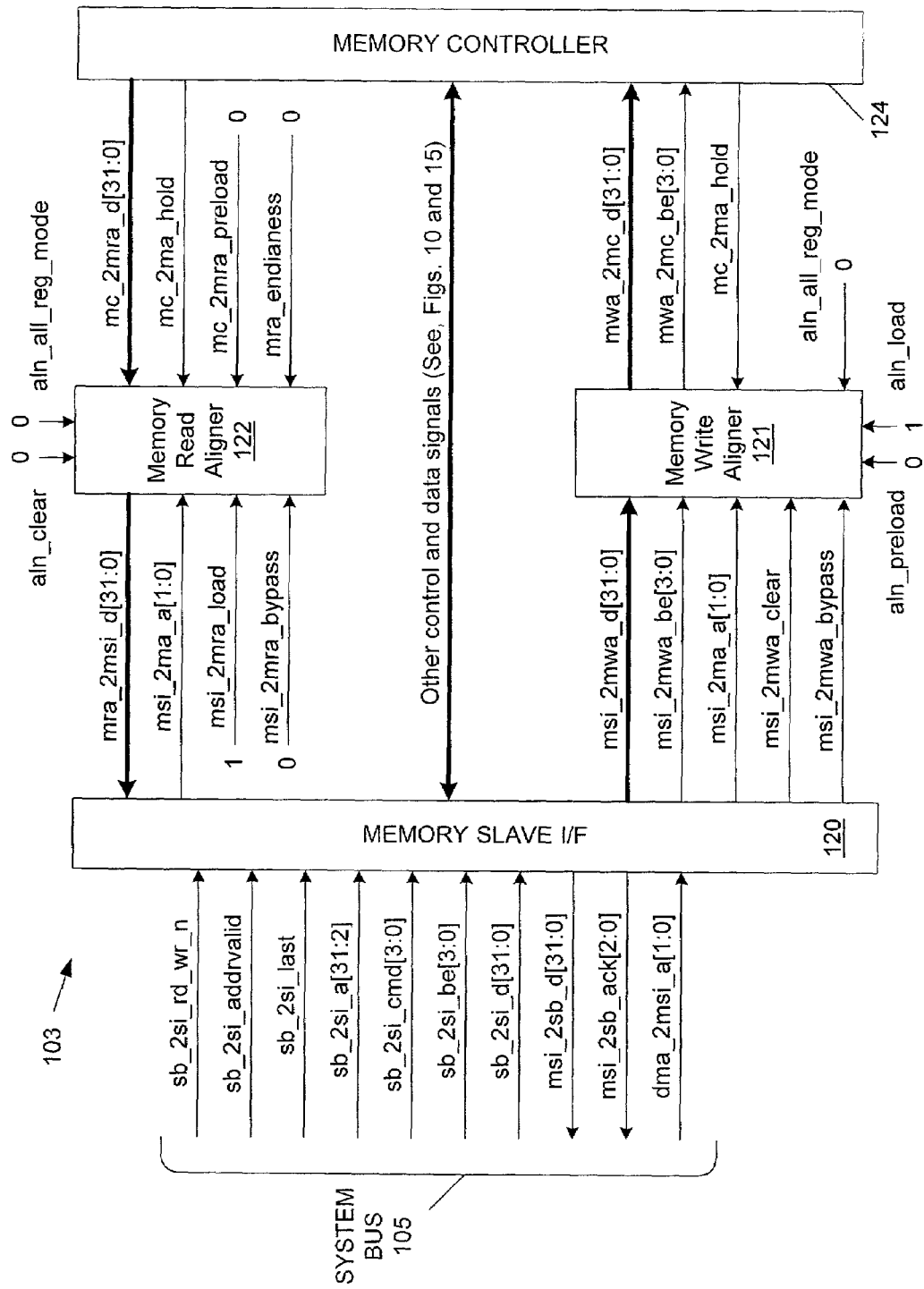
FIG. 9 is a block diagram of memory control device in accordance with one embodiment of the present invention.

FIG. 6 is a block diagram of a generic transaction aligner 500 in accordance with one embodiment of the present invention. Transaction aligner 500 includes output multiplexer 501, internal register 502, logical OR gate 503 and barrel shifter/endianess swapper 504. Each of transaction aligners 111–112 and 121–122 can be implemented using generic transaction aligner 500, or a subset of the functions of generic transaction aligner 500. Consequently, generic signals are used to describe the operation of transaction aligner 500. Specific signals, corresponding with the specific transaction aligners 111–112 and 121–122, are provided in more detail below. For example, the generic aln_hold signal of transaction aligner corresponds with the psi_2pra_hold signal in peripheral read aligner 111 (FIG. 7), the psi_2pwa_hold signal in peripheral write aligner 112 (FIG. 7), and the mc_2ma_hold signal in memory write aligner 121 and memory read aligner 122 (FIG. 9). Similar corresponding signals are found in transaction aligner 500 and aligners 111–112 and 121–122, wherein the last portion of each specific signal corresponds with the last portion of each generic signal (e.g., "_hold").

Transaction aligner 500 is capable of implementing the following functions: (1) shifting (aligning) data and byte-enable signals, (2) passing data and byte-enable signals without shifting (bypassing), (3) loading data and byte-enable signals into internal register 502, (4) holding data and byte-enable signals in internal register 502, (5) clearing data and byte-enable signals in internal register 502, and (6) performing endianess swapping. Transaction aligner 500 is clocked by the system clock signal (CLK), which is provided on system bus 105. Table 1 below defines the rest of the signals of transaction aligner 500.

TABLE 1

| Signal Name | Description |
| --- | --- |
| aln_input_d [31:0] | Data to be aligned |
| aln_input_be [3:0] | Byte-enables to be aligned |
| aln_a [1:0] | Alignment difference between source data and target data |
| aln_all_reg_mode | If aln_a [1:0] = 00, aln_all_reg_mode determines whether output data and byte-enables are taken from internal register 502 or directly from the data source. |
| aln_bypass | If asserted, aligner 500 will not align data and byte-enables. If not asserted, the data and byte-enables will be aligned. Endianess swapping is independent of this signal. |
| aln_clear | Instructs aligner 500 to clear internal register 502. Aln_clear has precedence over aln_load, aln_preload and aln_hold. |
| aln_load | Instructs aligner 500 to load data and byte-enables into internal register 502. |
| aln_preload | Instructs aligner 500 to load data and byte-enables into internal register 502. Aln_preload has the same function as aln_load, but is required where two independent devices wish to load data into aligner 500. |
| aln_hold | Instructs aligner 500 to not load data and byte-enables into internal register 502. Aln_hold has precedence over aln_load and aln_preload. |
| aln_endianess | Instructs aligner 500 to swap the endianess of aln_input_d [31:0] and aln_input_be [3:0]. |
| aln_output_d [31:0] | Aligned data |
| aln_output_be [3:0] | Aligned byte-enables |

As shown in FIG. 6, aligner 500 is a simple module with no internal state machines. Except for internal register 502, the elements of aligner 500 are combinational. The various blocks of aligner 500 operate as follows.

Barrel shifter/endianess swapper 504 processes the aln_input_d[31:0] and aln_input_be[3:0] signals in response to the aln_a[1:0], aln_bypass and aln_endianess signals. If the aln_bypass signal is asserted, then barrel shifter/endianess swapper 504 passes the aln_input_d[31:0] and aln_input_be[3:0] signals without shifting. If the aln_endianess signal is asserted, then barrel shifter/endianess swapper 504 changes the endianess of the aln_input_d[31:0] and aln_input_be[3:0] signals.

Barrel shifter/endianess swapper 504 includes a barrel shifter, which right-shifts the aln_input_d[31:0] and aln_input_be[3:0] signals in response to the alignment difference indicated by the aln_a[1:0] signal (assuming the aln_bypass signal is not asserted). The four data bytes and four byte enable bits provided by barrel shifter/endianess swapper are labeled as sd[3:0] and sb[3:0], respectively. Table 2 identifies the shifting performed by this barrel shifter in response to the alignment difference indicated by the aln_a[1:0] signal.

TABLE 2

| aln_a [1:0] | Barrel Shifter Function |
| --- | --- |
| 00 | Do not shift input data or input byte-enables. |
| 01 | Shift input data right by one byte. Shift input byte-enables right by one bit. |
| 10 | Shift input data right by two bytes. Shift input byte-enables right by two bits |
| 11 | Shift input data right by three bytes. Shift input byte-enables right by three bits |

Internal register 502 contains a 32-bit data register 511 and a 4-bit byte-enable register 512. Data register 511 stores 8-bit bytes rd[3], rd[2], rd[1] and rd[0]. Byte-enable register 512 stores 1-bit byte-enable signals rb[3], rb[2], rb[1] and rb[0]. Depending on the applied control signals, register 502 either loads new data and byte enable signals, or holds previously loaded data and byte enable signals. Byte-enable register 512 can be cleared to zeros in response to the aln_clear signal. Table 3 defines the operation of internal register 502 in response to the aln_clear, aln_hold, and the output of OR gate 503 (i.e., the logical OR of the aln_load and aln_preload signals).

TABLE 3

| aln_clear | aln_hold | OR | Register Action |
| --- | --- | --- | --- |
| 1 | X | X | Clear byte_enable register 512 |
| 0 | 0 | 0 | Don't register data or byte_enables into register 502 |
| 0 | 0 | 1 | Register data and byte_enables into register 502 |
| 0 | 1 | 0 | Don't register data or byte_enables into register 502 |
| 0 | 1 | 1 | Don't register data or byte_enables into register 502 |

Output multiplexer 501 contains the multiplexing logic required to obtain the aligned data and byte_enable signals aln_output_d[31:0] and aln_output_be[3:0]. Output multiplexer 501 is controlled by the aln_a[1:0], aln_bypass and aln_all_reg_mode signals. If the aln_bypass signal is asserted, then output multiplexer 501 passes the data and byte-enable signals provided by barrel shifter/endianess swapper 504. If the bypass signal is de-asserted, and the aln_a[1:0] signal has a value of "00", then the aln_all_reg_mode determines the manner in which multiplexer 501 operates. If the aln_all_reg_mode has a logic "0" value, then output multiplexer 501 routes the data and byte enable signals provided by barrel shifter/endianess swapper 504. Conversely, if the aln_all_reg_mode has a logic "1" value, then output multiplexer 501 routes the data and byte enable signals provided by internal register 502.

If the aln_bypass signal has a logic "0" value, and the aln_a[1:0] signal has a value other than "00", then the aln_a[1:0] signal determines which values are shifted through output multiplexer 501. In this case, output multiplexer passes some data bytes and byte enables from internal register 511, and some data bytes and byte enables from barrel shifter/endianess swapper 504. Table 4 summarizes the operation of output multiplexer 501.

TABLE 4

| aln_bypass | aln_all_reg_mode | aln_a [1:0] | Aln_output_d [31:0], Aln_output_be [3:0] |
|---|---|---|---|
| 0 | 1 | 00 | rd [3] rd [2] rd [1] rd [0], rb [3] rb [2] rb [1] rb [0] |
| 0 | 0 | 00 | sd [3] sd [2] sd [1] sd [0], sb [3] sb [2] sb [1] sb [0] |
| 0 | X | 01 | rd [3] sd [2] sd [1] sd [0], rb [3] sb [2] sb [1] sb [0] |
| 0 | X | 10 | rd [3] rd [2] sd [1] sd [0], rb [3] rb [2] sb [1] sb [0] |
| 0 | X | 11 | rd [3] rd [2] rd [1] sd [0], rb [3] rb [2] rb [1] sb [0] |
| 1 | X | X | sd [3] sd [2] sd [1] sd [0], sb [3] sb [2] sb [1] sb [0] |

The following examples illustrate the use of generic transaction aligner 500. In the first example, transaction aligner 500 is used as a read transaction aligner, such that data is transferred from a peripheral device (e.g., slave peripheral 113 or memory controller 124) to system bus 105. In the first example, the FIFO data represented by FIG. 3 is routed through transaction aligner 500, thereby providing the data to system bus 105 in the manner illustrated in FIG. 4.

Initially, the first data entry 201 from FIFO 114 (i.e., "xxAB") is provided to barrel shifter 504. As described in more detail below, the read transaction aligners of the present invention do not process aln_input_be[3:0] byte enable signals, because the byte enable signals are provided by DMA controller 101. The aln_a[1:0] signal has a value of "10", because the first valid data byte "A" has an alignment offset of two (10) positions with respect to the desired aligned position of "00". In response, barrel shifter 504 shifts the first data value 201 to the right by two byte locations, as illustrated in Table 2. As a result, barrel shifter 504 provides an output data value equal to "ABxx". The aln_preload signal is asserted high (and the aln_hold and aln_clear signals are de-asserted low), thereby causing the shifted data bytes "A" and "B" to be loaded into locations rd[3] and rd[2], respectively, in data register 511.

During the next clock cycle, the second data entry 202 of FIFO 114 is provided to barrel shifter 504. Again, barrel shifter 504 shifts this second data entry 202 to the right by two positions. As a result, barrel shifter 504 provides an output data value equal to "EFCD". In response to the aln_a[1:0] signal of "10" (and the aln_bypass signal of "0") output multiplexer 501 provides an aln_output_d[31:0] signal equal to data register values rd[3], rd[2], and barrel shifter 504 values sd[1] and sd[0] (Table 5). That is, output multiplexer 501 provides an aln_output_d[31:0] signal equal to "ABCD". Note that this corresponds with data value 301 of FIG. 4.

Also during this clock cycle, the aln_load signal is asserted, thereby latching the output data value "EFCD" provided by barrel shifter 504 into data register 511. This process repeats during the next clock cycle, such that output multiplexer 501 routes the "EF" bytes from data register 511, and the "GH" bytes from barrel shifter 504, thereby providing an aln_output_d[31:0] signal equal to "EFGH". Note that this corresponds with data value 302 of FIG. 4.

Notice that whenever data is aligned from a higher byte location to a lower byte location (i.e., location "10" to location "00"), transaction aligner 500 must hold partial bytes in internal register 502, and then wait for the rest of the bytes to arrive before placing the data word on the system bus 105. This situation implies that the first data word provided by transaction aligner 500 is "garbage" data. To avoid placing garbage data on system bus 105, the peripheral must pre-load internal register 502 with the first bytes (e.g., A and B) before the transfer starts. The peripheral is then controlled to drive the subsequent bytes (e.g., CDEF) to transaction aligner 500. However, these subsequent bytes (CDEF) are not loaded into data register 511 until after the transfer starts. When the transfer starts, aligner 500 will concatenate bytes A and B from data register 511 with bytes C and D to form the word "ABCD" on system bus 105.

In the second example, generic transaction aligner 500 is used as a write transaction aligner, such that data is transferred from system bus 105 to a peripheral device (e.g., FIFO 114 or memory controller 124). In the second example, the system bus data represented by FIG. 4 is routed through transaction aligner 500, thereby providing the data to memory controller 124 in the manner illustrated in FIG. 5.

Prior to this transaction, the aln_clear signal is asserted high, thereby causing all of the entries of byte-enable register 512 to be cleared to logic zero values. Initially, the first data entry 301 from system bus 105 (i.e., "ABCD") is provided to barrel shifter 504. The aln_a[1:0] signal has a value of "11", because the first valid data byte "A" has an alignment offset of three ("11") positions with respect to the desired position of "11". In response, barrel shifter 504 shifts the first data value 301 to the right by three byte locations, as specified by Table 2. As a result, barrel shifter 504 provides a data output (i.e., sd[3:0]) having a value of "BCDA". Barrel shifter 504 also provides a byte-enable output (i.e., sb[3:0]) having a value of "1111". Unlike the previous example, the data bytes are being shifted from a lower byte location to a higher byte location. Thus, transaction aligner 500 does not need to "wait" for bytes, because all of the required bytes are present during the first clock cycle.

As specified by Table 4, output multiplexer 501 routes data values rd[3:1] from data register 511 and data value sd[0] (i.e., data byte "A") from barrel shifter 504. Output multiplexer also routes byte-enable values rb[3:1] (i.e., "000") and byte-enable value sb[0] (i.e., "1") from barrel shifter 504. Because byte enable signals rb[3:1] all have logic "0" values (because the aln_clear signal was asserted prior to the transaction), the value of data value rd[3:1] is irrelevant, as this data value will not be written to main memory 104. Because byte-enable signal sb[0] has a logic "1" value, a value of "xxxA" will be written to main memory 104. This is consistent with data word 401 of FIG. 5.

At the end of the first cycle, the aln_load signal is asserted high (and the aln_hold and aln_clear signals are de-asserted low), thereby causing the shifted data bytes "B" "C" "D" and "A" to be loaded into locations rd[3], rd[2], rd[1] and rd[0], respectively in data register 511. The byte-enable signal having a "1111" value is also loaded into locations rb[3:0] of byte-enable register 512. During the second cycle, barrel shifter receives data word 302 (i.e., "EFGH") from system bus 105. Barrel shifter 504 shifts this word to the right by three bytes, thereby providing an output data word sd[3:0] having a value of "FGHE". Output multiplexer 501 again provides data values rd[3:1] from data register 511 and data value sd[0] from barrel shifter 504. Thus, during the second cycle, output multiplexer 501 provides the data word "BCDE". Output multiplexer 501 also routes byte-enable values rb[3:1] (i.e., "111") and byte enable value sb[0] (i.e., "1") from barrel shifter 504. Because all of the byte-enable signals have a logic "1" value, the entire data word "BCDE" will be written to main memory 104. This is consistent with data word 402 of FIG. 5. Processing continues in this manner until all of data words 301–307 are processed to create data words 401–408.

Having described the generic transaction aligner 500, the description will now turn to the specific transaction aligners 111–112 and 121–122 in system 100 during fly-by read and fly-by write operations.

Figure 7:
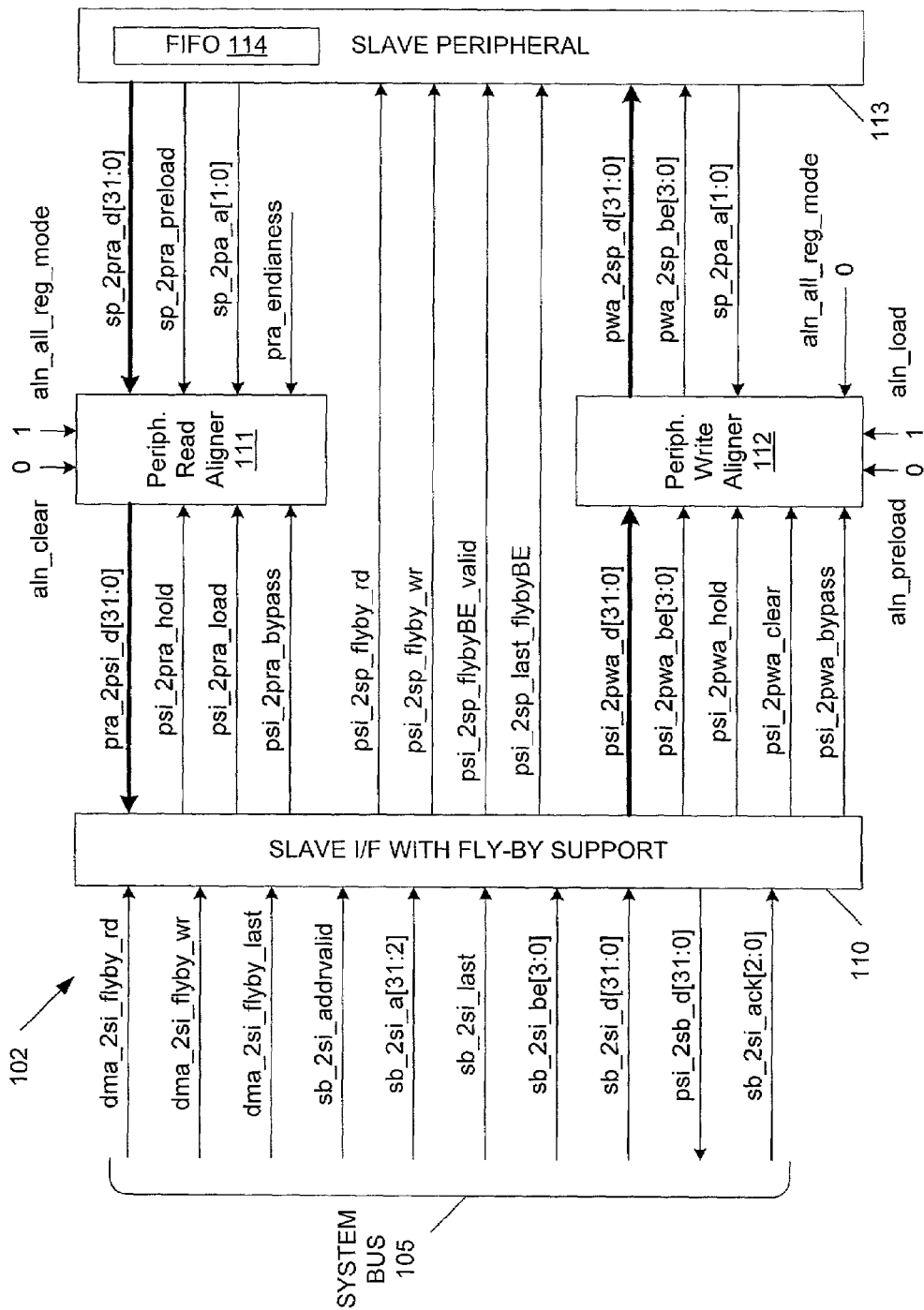
FIG. 7 is a block diagram of a slave peripheral device in accordance with one embodiment of the present invention.

FIG. 7 is a block diagram of slave device 102, which illustrates the signals used by slave device 102. The abbreviations used in the signal naming protocol are defined below in Table 5. These abbreviations are used throughout FIGS. 7–15.

TABLE 5

| Symbol | System Element |
|---|---|
| sp | Slave peripheral 113 |
| psi | Peripheral slave interface 110 |
| pra | Peripheral read aligner 111 |
| pwa | Peripheral write aligner 112 |
| pa | Peripheral read aligner 111 and Peripheral write aligner 112 |
| sb | System bus 105 |
| dma | DMA controller 101 |
| mc | Memory controller 124 |
| msi | Memory slave interface 120 |
| mra | Memory read aligner 122 |
| mwa | Memory write aligner 121 |
| ma | Memory read aligner 122 and Memory write aligner 121 |
| msi | Memory slave interface 120 |
| si | Peripheral slave interface 110 or Memory slave interface 120 (from system bus 105) |

A signal from one element to (2) another element is defined in the following format {originating element}_2{destination element}_{name of signal}. For example, the preload signal transmitted from slave peripheral 113 to peripheral read aligner 111 is defined as the "sp_2pra_preload" signal.

During CPU reads and writes, the aligners 111–112 and 121–122 must not align data or byte-enables since CPU accesses (to control registers or FIFOs) do not require data alignment. To prevent alignment in this case, the corresponding slave interface will assert the "bypass" signal to the appropriate aligner whenever a CPU access occurs. For example, the psi_2pra_bypass and psi_2pwa_bypass signals are asserted to bypass peripheral read aligner 111 and peripheral write aligner 112, respectively. Note that even if a "bypass" signal is asserted to a particular aligner, that aligner can still perform endian swapping, if required.

During DMA fly-by read and write accesses, peripheral aligners 111–112 and memory aligners 121–122 must be capable of aligning data. The operation of slave peripheral device 102 during a fly-by read operation will now be described.

Fly-By Read—(Slave Peripheral Device 102)

Figure 8:
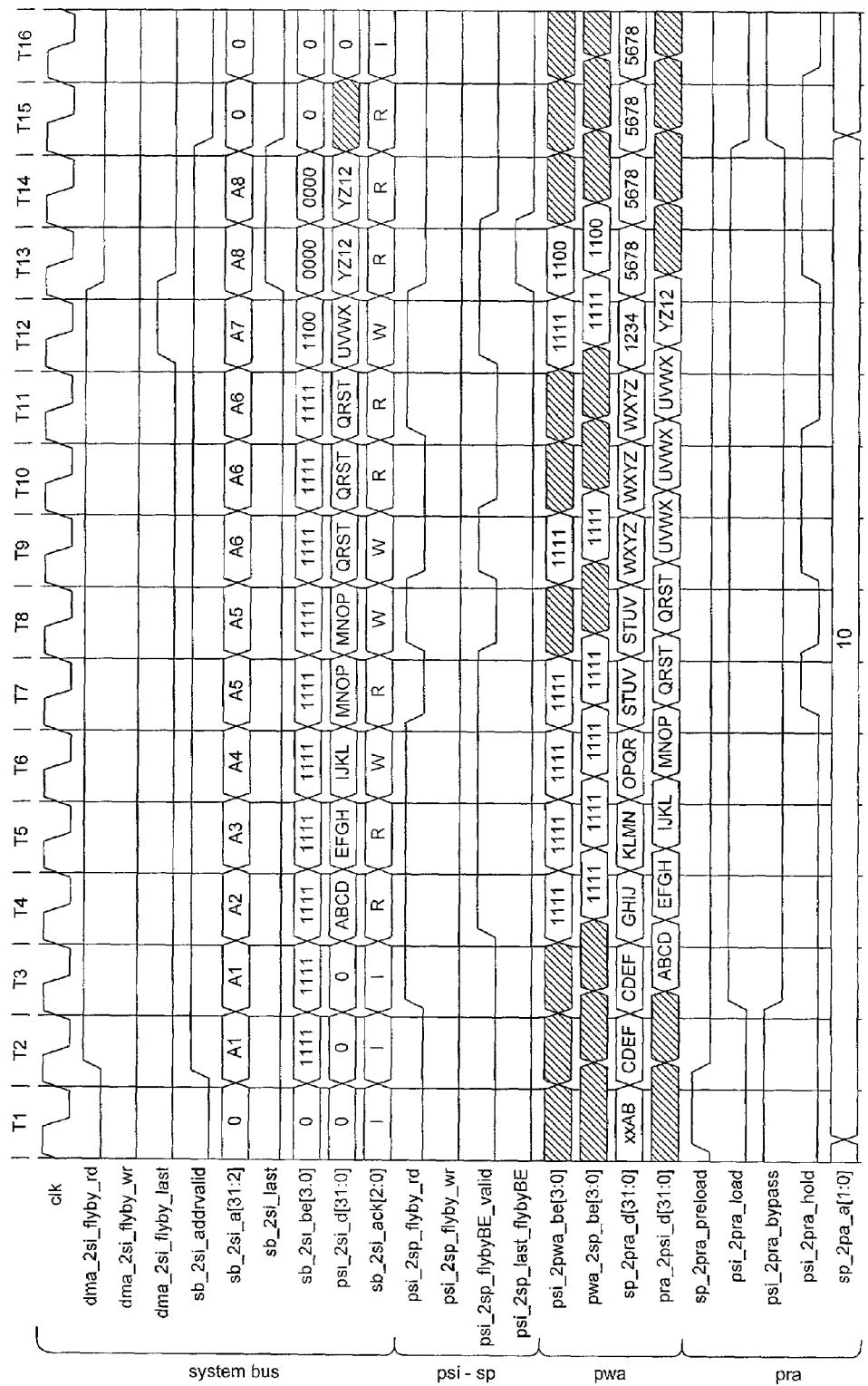
FIG. 8 is a waveform diagram illustrating signals associated with the slave peripheral device of FIG. 7 during a fly-by read operation.

FIG. 8 is a waveform diagram illustrating signals associated with slave peripheral device 102 during a fly-by read operation. Slave peripheral device 102 begins a fly-by read operation by providing a read request (REQ) signal and a byte count (BYTE_COUNT) signal to DMA controller 101 (not shown). The BYTE_COUNT signal identifies the number of bytes to be provided by slave peripheral device 102 during the fly-by read operation. DMA controller 101 uses the byte count information to determine the size of the fly-by transfer on system bus 105. DMA controller 101 subsequently provides a grant (GNT) signal back to slave device 102 (not shown), thereby indicating that the fly-by read transfer may begin.

After receiving the GNT signal from DMA controller 101, slave peripheral device 102 pre-loads peripheral read aligner 111 with the first data word involved in the fly-by read transfer. In the example represented by FIGS. 3–4, this first data word is "xxAB", where the first two bytes (i.e., "xx") are not to be transmitted on system bus 105. During the first clock cycle T1, slave peripheral 113 provides the first data word "xxAB" to peripheral read aligner 111 as the sp_2pra_d[31:0] signal. Upon providing the first data word, the read pointer of FIFO 114 is incremented. Also during the first clock cycle, the slave peripheral 113 asserts the sp_2pra_preload signal, which causes peripheral read aligner 111 to latch the first data word ("xxAB") at the rising edge of the second clock cycle T2.

Slave peripheral 113 also drives the sp_2pra_a[1:0] signal to a "10" value, thereby identifying the location of the first byte in the first data word to be transferred. Note that "10" corresponds with the third byte of the first data word (i.e., byte "A"). Because the sp_2pra_a[1:0] signal is used to control the routing of data words through peripheral read aligner 111, this signal is continuously driven with the same value until the fly-by read transfer is complete.

During the second clock cycle T2 (after peripheral read aligner 111 has been pre-loaded with the first data word), slave peripheral 113 de-asserts the sp_2pra_preload signal and provides the second data word to be transferred (i.e., "CDEF") to peripheral read aligner 111. However, because neither the sp_2pra_preload signal nor the psi_2pra_load signal is asserted at this time, the "CDEF" value is not loaded into peripheral read aligner 111. Slave peripheral 113 then waits for peripheral slave interface 110 to assert the psi_2sp_flyby_rd signal before providing subsequent data words to peripheral read aligner 111 and incrementing the read pointer of FIFO 114.

Also during the second cycle T2, DMA controller 101 starts the fly-by read transfer across system bus 105 by asserting the fly-by read signal, dma_2si_flyby_rd. At the rising edge of the third clock cycle T3, peripheral slave interface 110 detects this fly-by read signal on system bus 105 and, in response, asserts the psi_2sp_flyby_rd signal during the third clock cycle T3. Peripheral slave interface 110 also asserts the psi_2pra_load signal and de-asserts the psi_2pra_bypass signal at this time. This enables the data values provided by FIFO 114 to be loaded into peripheral read aligner 111 in the manner described above in connection with generic transaction aligner 500. These "load" and "bypass" signals retain these states for the duration of the fly-by read operation. Note that peripheral slave interface 110 may assert the psi__2pra_hold signal in response to a Wait state detected on system bus 105, thereby preventing data values from being registered into peripheral read aligner 111.

During the third clock cycle T3, peripheral read aligner 111 provides an output data value pra__2psi_d[31:0] equal to "ABCD". This "ABCD" data word is provided in the manner described above for generic transaction aligner 500 (FIG. 6). At the rising edge of the fourth clock cycle T4, this "ABCD" data word is provided to system bus 105 (via peripheral slave interface 110) as the psi__2sb_d[31:0] signal.

Also during the fourth clock cycle T4, peripheral slave interface 110 provides byte-enables to peripheral write aligner 112 as the psi__2pwa_be[3:0] signal. These byte-enables correspond with the sb__2si_be[3:0] signal provided on system bus 105 during clock cycle T2. According to the system bus protocol, the byte-enables sb__2si_be[3:0] provided during cycle T2 identify the bytes of the psi_sb_d[31:0] data signal that are valid during cycle T4. During the flyby read operation, peripheral slave interface 110 buffers the byte enables on the system bus corresponding to each data value and provides them to peripheral write aligner 112. Peripheral slave interface 110 also asserts a logic high psi__2pwa_bypass signal, thereby causing peripheral write aligner 112 to pass the psi__2pwa_be[3:0] signal to slave peripheral 113 as the pwa__2sp_be[3:0] signal. That is, the byte-enable signals provided by DMA controller 101 on system bus 105 are transmitted to slave peripheral 113 during the fly-by read operation.

Note that the byte enables are driven on system bus 105 in advance of the corresponding data words in accordance with the bus protocol. This allows decoding to be performed prior to receiving the data word. In general, byte enable information is provided at least one Ready state before the data. A Wait state on the system bus will result in the byte enables being ignored during the next cycle.

At the rising edge of the fourth clock cycle T4, peripheral slave interface 110 asserts a logic high psi__2sp_flybyBE_valid signal, thereby indicating that the byte enable signals on system bus 105 are being passed to slave peripheral 113. Upon receiving the psi__2sp_flybyBE_valid signal, slave peripheral 113 registers the byte-enables (i.e., the pwa__2sp_be[3:0] signal) received from peripheral write aligner 112 via the flyby slave interface 110 from system bus 105. In this manner, slave peripheral 113 is able to maintain a count of the bytes actually transferred on system bus 105.

Also during the fourth clock cycle T4, the word "CDEF" is latched into the data register in peripheral read aligner 111 as the data word "EFCD". At the same time, the data word "GHIJ" is read from FIFO 114, and the read pointer of FIFO 114 is again incremented. The data word "GHIJ" is shifted by the barrel shifter in peripheral read aligner 111, thereby creating shifted data word "IHGH". Thus, peripheral read aligner 111 provides a data output word (pra__2psi_d[31:0]) having a value of "EFGH" during cycle T4.

At the rising edge of the fifth clock cycle T5, peripheral slave interface 110 provides the data word "EFGH" on system bus 105. The psi__2sp_flybyBE_valid signal still has a logic high value, thereby causing the "1111" byte-enable signals corresponding with the data word "EFGH" to be registered and counted by slave peripheral 113.

Processing continues in the foregoing manner through cycle T6. During cycle T6, memory control device 103 asserts a Wait state on system bus 105, using the sb__2si_ack[2:0] signal. On the rising edge of clock cycle T7, this Wait state is detected by peripheral slave interface 110. In response, peripheral slave interface 110 de-asserts the psi__2sp_flyby_rd signal and asserts the psi__2pra_hold signal. As a result, peripheral read aligner 111 holds the data word registered during the previous clock cycle (i.e., "OPQR"), and provides the corresponding output signal "MNOP". FIFO 114 is not incremented while the psi__2sp_flyby_rd signal is de-asserted.

During cycle T7, memory control device 103 asserts a Ready state on system bus 105, again using the sb__2si_ack[2:0] signal. On the rising edge of clock cycle T8, this Ready state is detected by peripheral slave interface 110. In response, peripheral slave interface 110 asserts the psi__2sp_flyby_rd signal and de-asserts the psi__2pra_hold signal. As a result, peripheral read aligner 111 provides the next output data word "QRST". In addition, peripheral slave interface 110 de-asserts the psi__2sp_flybyBE_valid signal, such that slave peripheral 113 does not register and count byte-enable signals during this clock cycle.

Processing continues in the manner described above, with memory control device 103 asserting Wait states during clock cycles T8, T9 and T12, and Ready states during clock cycles T10–T11 and T13–T15.

DMA controller 101 asserts the dma__2si_flyby_last signal during cycle T12 to indicate to peripheral slave interface 110 that the current byte-enables on system bus 105 are the last byte enables that should be passed to slave peripheral 113. Upon detecting the dma__2si_flyby_last signal at the rising edge of cycle T13, peripheral slave interface 110 asserts the psi__2sp_last_flybyBE signal. At the rising edge of cycle T14, slave peripheral 113 detects the logic high psi__2sp_last_flybyBE signal, which indicates that the last valid byte-enable signal has been sent. Peripheral slave interface 110 de-asserts the psi__2sp_flyby_BE_valid signal upon detecting the logic high psi__2sp_last_flybyBE signal at the rising edge of clock cycle T14. At this time, slave peripheral 113 stops registering and counting byte enables. It is important for slave peripheral 113 to keep track of the number of valid byte enables, as this enables slave peripheral 113 to maintain a count of the number of bytes actually transferred by DMA controller 101. The number of bytes actually transferred will be used to determine the final location of the read pointer of FIFO 114. The number of bytes actually transferred will also be used to determine the number of bytes that must be transferred by slave device 102 during the next fly-by read transfer.

In the present example, DMA controller 101 places an address A8 on system bus 105 during cycles T13 and T14 to flush memory write aligner 121. When driving the address A8, DMA controller 101 drives the byte-enables (i.e., the sb__2si_be[3:0] signal) to "0000" and de-asserts the dma__2si_flyby_rd signal. As a result, slave peripheral 113 is completely unaware of this last address.

For fly-by read operations, the final location of the read pointer of FIFO 114 is a tricky case. Because peripheral read aligner 111 is pre-loaded, and the read pointer of FIFO 114 is incremented every time the psi__2sp_flyby_rd signal is asserted by slave interface 110, the final location of the FIFO read pointer does not correspond to the word location of the last byte transferred from FIFO 114. For example, assume one FIFO word (e.g., "ABCD") starting at FIFO read pointer location '1' is to be transferred. In this case, slave device 102 requests that DMA controller 101 transfer 1 data word (i.e., BYTE_COUNT=4). In response, DMA controller 101 will eventually issue a GNT signal. Upon receiving the GNT signal, slave peripheral 113 pre-loads peripheral read aligner 111 with the word to be transferred. After pre-loading, slave peripheral 113 increments its FIFO read pointer to point to the next FIFO word (location '2' in FIFO 114). Eventually, the fly-by read transfer starts across system bus 105, and slave interface 110 asserts the psi__2sp_flyby_rd signal to slave peripheral 113, which in turn, will cause the read pointer of FIFO 114 to be incremented (to location '3' in the FIFO). After the first word has been transferred, the fly-by read operation would finish and all fly-by signals would be de-asserted.

However, the FIFO read pointer ends at location '3', when it should be at location '2' since only the word in location '1' was transferred. This incorrect FIFO location is the result of pre-loading, because pre-loading advanced the FIFO read pointer even though a data word was not yet transferred. In this example, the slave peripheral 113 must "backup" the read pointer of FIFO 114 to location '2' before requesting another transfer of the DMA controller 101. Notice that if only partial bytes of the first word had been transferred, the FIFO pointer would have to 'backup' to FIFO location '1' since some of the bytes in this location have not yet been transferred.

Thus, after each fly-by read operation, the read pointer of FIFO 114 must be backed up by either one or two locations. In order to determine the number of locations that the FIFO read pointer should backup, slave peripheral 113 must look at the alignment of the first byte transferred (i.e., the sp__2pa_a[1:0] signal driven by slave peripheral 113) and the last byte-enables passed by slave interface 110 during the fly-by read transfer. Note that DMA controller 101 always places a full set of byte enables ("1111") on system bus 105, except for the last set of byte enables, which may be partial. This is because DMA controller 101 assumes that there are no gaps in the data bytes transferred on system bus 105. The following method indicates the amount to backup:

| Fly-by Read FIFO pointer backup algorithm |
| --- |
| if(sp__2pa_a[1:0] == 00) {<br>　if (last flyby byte_enables == 1111)<br>　　backup 1;<br>　else backup 2;<br>}<br>if(sp__2pa_a[1:0] == 01) {<br>　if (last_flyby byte enables==1110 or 1111)<br>　　backup 1;<br>　else backup 2;<br>}<br>if(sp__2pa_a[1:0] == 10) {<br>　if (last_flyby_byte_enables== 1100 or 1110 or 1111)<br>　　backup 1;<br>　else backup 2;<br>}<br>if(sp__2pa_a[1:0] == 11) {<br>　backup 1; //always since BE=0000 is not allowed at end of a<br>　fly-by read transfer<br>} |

Transaction Aligners in Memory Control Device 103

FIG. 9 is a block diagram which illustrates the signals used by memory control device 103. As described above, memory write aligner 121 and a memory read aligner 122 are required in memory control device 103. Memory read aligner 122 handles data transfers from main memory 104 to system bus 105, and memory write aligner 121 handles data (and byte-enables) going from system bus 105 to main memory 104. The aligners 121–122 in memory control device 103 are connected differently than the aligners 111–112 in slave device 102. This is because certain actions required in slave device 102, such as pre-loading, are not required (or possible) in memory control device 103. DMA controller 101 eliminates or compensates for the need for these actions in memory control device 103 by issuing special byte-enables when required.

Fly-By Read—(Memory Control Device 103)

The fly-by read operation will now be described with respect to memory control device 103. During a fly-by read operation, DMA controller 101 drives the two least significant bits of the first address in main memory 104 to be accessed during the fly-by read operation. These two least significant bits are provided to memory slave interface 120 as the dma_2msi_a[1:0] alignment signal. This alignment signal, which remains unchanged through the entire fly-by read transfer, is registered by memory slave interface 120, and passed to memory aligners 121–122 as the msi__2ma_a [1:0] signal.

During the fly-by read operation, slave device 102 drives fully aligned data values onto system bus 105 as the psi__2sb_d[31:0] signal in the manner described above. These fully aligned data values are provided to memory slave interface 120 as the sb__2si_d[31:0] signal. DMA controller 101 drives byte enable signals sb__2si_be[3:0] corresponding to the aligned data on system bus 105. Memory slave interface 120 provides these data values and byte enable signals to memory write aligner 121 as the msi__2mwa_d [31:0] and msi__2mwa_be[3:0] signals, respectively. Memory write aligner 121 aligns these data values and byte enable signals in response to the value of the msi__2ma_a [1:0] alignment signal, thereby providing the mwa__2mc_d [31:0] and mwa__2mc_be[3:0] signals. Memory controller 124 performs write operations to main memory 104 using the mwa__2mc_d[31:0] and mwa__2mc_be[3:0] signals.

During a fly-by read transfer, memory controller 124 may issue Wait states to memory slave interface 120 via a mc__2msi_ack signal. When memory controller 124 issues a Wait state, memory controller 124 also asserts the hold signal to memory write aligner 121 (i.e., mc__2ma_hold), such that the data and byte enables stored in the internal register of memory write aligner 121 are preserved.

If the msi__2ma_a[1:0] alignment signal has a value other than "00" (i.e., the memory address is unaligned), then memory write aligner 121 might have to be "flushed" at the end of the fly-by read transfer (depending on the number of bytes transferred). To flush memory write aligner 121, DMA controller 101 provides the last address in memory to be written, with a corresponding byte-enable signal of "0000" on system bus 105. The last address and "0000" byte-enable signal cause the remaining data and byte enables stored in the internal register of memory write aligner 121 to be provided to memory controller 124, such that the last data values stored in memory write aligner 121 can be written to main memory 104.

At the end of the fly-by read transfer, if system bus 105 is not locked, memory slave interface 120 clears the internal register of memory write aligner 121 by asserting the msi__2mwa_clear signal in order to prepare for a new transfer.

Note that the msi__2 mwa_bypass signal is held at a logic low value, such that memory write aligner 121 is not bypassed. During CPU memory read operations, the msi__ 2mwa_bypass signal is held at a logic high value, and data transfer occurs directly between memory slave interface 120 and memory controller 124, with memory write aligner 121 being effectively removed from the data path (i.e., bypassed).

Figure 10:
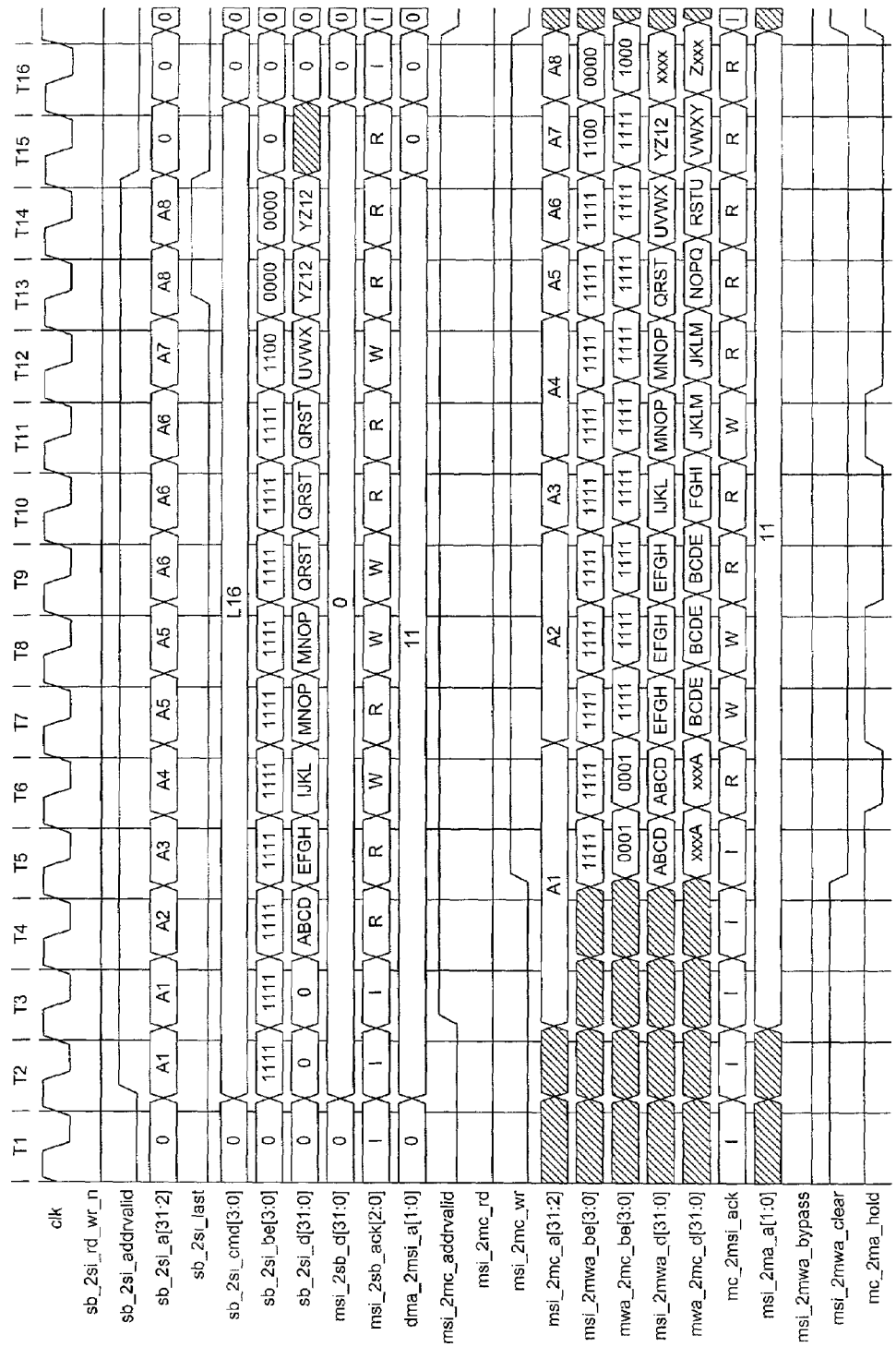
FIG. 10 is a waveform diagram illustrating signals associated with the memory control device of FIG. 9 during a fly-by read operation.

FIG. 10 is a waveform diagram illustrating signals associated with memory control device 103 during a fly-by read operation. This waveform diagram corresponds with the fly-by read operation illustrated in FIG. 8. Thus, many of the signals illustrated in FIG. 8 are also illustrated in FIG. 10. More specifically, FIG. 10 illustrates a particular fly-by read transfer from system bus 105 through the memory slave interface 120 and memory write aligner 121 into memory controller 124, while FIG. 8 illustrates the same fly-by read transfer from the peripheral FIFO 114, through peripheral read aligner 111 and slave interface 110, onto system bus 105. The following signals are common to FIGS. 8 and 10: clk, sb_2si_addrvalid, sb_2si_a[31:2], sb_2si_last, and sb_2si_be[3:0] (i.e., the system bus signals).

The data provided to memory slave interface 120 on system bus 105 (i.e., sb_2si_d[31:0]) is the same fly-by read data provided by peripheral slave interface 110 to system bus 105 (i.e., psi_2sb_d[31:0]). (See, FIG. 8.)

The Idle, Ready and Wait states placed on the system bus (i.e., the sb_2si_ack[2:0] signal in FIG. 8) are originated in memory control device 103, and are therefore provided from memory controller 124 to memory slave interface 120 as the mc_2msi_ack[1:0] signal, and from memory slave interface 120 to system bus 105 as the msi_2sb_ack[2:0] signal (FIG. 10).

The byte enable signal sb_2si_be[3:0] is provided by DMA controller 101 in the manner described above in connection with FIG. 8.

During the fly-by read operation, memory slave interface 120 does not provide data to system bus 105. Thus, the msi_2sb_d[31:0] data signal has a zero value in the present example.

During cycle T2, the sb_2si_addrvalid signal provided by DMA controller 101 has a logic "1" value, the sb_2si_a[31:2] address signal provided by DMA controller 101 has the initial address value "A1", and the sb_2si_be[3:0] byte enable signal provided by DMA controller 101 has a value of "1111". These signals, which have been described above in connection with FIG. 8, are detected by memory slave interface 120 at the rising edge of cycle T3. Note that there is no fly-by signal provided to memory slave interface 120. This is because memory controller 103 is a slave on system bus 105, and as such responds to bus transactions that fall in its address space. Memory slave interface 120 is not informed which bus master started the bus transfer, or which device is placing data on system bus 105. During a fly-by read transfer, the DMA controller 101 starts the bus transfer into the address space of memory controller 104, and the fly-by peripheral places data onto system bus 105.

Also during cycle T2, DMA controller 101 provides the alignment signal, dma_2msi_a[1:0], to memory slave interface 120. This alignment signal dma_2msi_a[1:0], together with sb_2si_a[31:2], identify the byte location and word address in main memory 104 to which the fly-by read data will be aligned. In the described example, the dma_2msi_a[1:0] signal has a value of "11", thereby indicating that the fly-by read data provided on system bus 105 (i.e., sb_2si_d[31:0]) will be aligned with byte location "11" in main memory 104. (See, FIG. 5.) The dma_2msi_a[1:0] signal remains at the same value during the fly-by read operation.

Also during cycle T2, DMA controller 101 provides a command signal (sb_2si_cmd[3:0]) having a value of "L16" and a read/write control signal (sb_2si_rd_wr_n) having a value of "0" to memory slave interface 120. These signals are detected by memory slave interface 120 at the rising edge of cycle T3. The "L16" value of the sb_2si_cmd[3:0] signal indicates that no more than 16 words will be transferred, and the "0" value of the sb_2si_rd_wr_n signal indicates that the data on system bus 105 is to be written into memory slave 103.

In response to the asserted sb_2si_addrvalid signal, memory slave interface 120 asserts a logic high msi_2mc_addrvalid signal to memory controller 124. Memory slave interface 120 also routes the initial address value "A1" to memory controller 124 as the msi_2mc_a[31:2] address signal. At the rising edge of cycle T4, memory controller 124 detects these signals and begins decoding the initial address value "A1".

Also during cycle T3, memory slave interface 120 routes the dma_2msi_a[1:0] alignment signal (i.e., "11") to memory write aligner 121 as the msi_2ma_a[1:0] alignment signal. At the rising edge of cycle T4, memory write aligner 121 detects this alignment signal. As mentioned above, memory write aligner 121 will cause the incoming fly-by read data to be aligned with byte location "11" in main memory 104 in response to this "11" alignment signal.

Also during cycle T4, slave peripheral device 102 provides the first fly-by read data value "ABCD" to system bus 105 in the manner described above (FIG. 8). This fly-by read data value "ABCD" is provided to memory slave interface 120 as the sb_2si_d[31:0] data signal. Also during cycle T4, DMA controller 101 provides the sb_2si_a[31:2] address signal "A2". These signals are detected by memory slave interface 120 at the rising edge of cycle T4.

In response, memory slave interface 120 provides the "ABCD" data value to memory write aligner 121, as the msi_2mwa_d[31:0] signal during cycle T5. Also during cycle T5, memory write aligner 121 shifts the msi_2mwa_d[31:0] signal "A1" in response to the "11" alignment signal msi_2ma_a[1:0], such that memory write aligner 121 provides a mwa_2mc_d[31:0] data signal having a value of "xxxA" to memory controller 124. Note that this "xxxA" mwa_2mc_d[31:0] signal represents the "ABCD" data value shifted into alignment with byte location "11".

Also during cycle T5, memory write aligner 121 provides a byte enable signal, mwa_2mc_be[3:0], having a value of "0001" to memory controller 124 in response to the "11" alignment signal msi_2ma_a[1:0] and the "1111" byte enable signal sb_2si_be[3:0] provided during cycle T2.

Also during cycle T5, memory slave interface 120 de-asserts the msi_2mwa_clear signal low, such that data can be loaded into the internal register 502 within memory write aligner 121 (without being cleared). The msi_2mwa_clear signal remains low until after the fly-by read operation is complete.

Also during cycle T5, slave peripheral device 102 provides the second fly-by read data value "EFGH" on system bus 105 as the sb_2si_d[31:0] signal, and DMA controller 101 provides the next address signal "A3" on system bus 105 as the sb_2si_a[31:2] signal.

During cycle T6, memory controller 124 provides a mc_2msi_ack signal identifying a Ready state to memory slave interface 120. This Ready state is transmitted on the system bus as the msi_2sb_ack[2:0] signal during the next clock cycle T6. This pattern continues during subsequent cycles, with the memory controller 124 providing a mc_2msi_ack signal identifying a Ready, Wait or Idle state to memory slave interface 120 during one cycle, and memory slave interface 120 routing this same signal to system bus 105 as the msi_2sb_ack[2:0] signal during the next cycle.

Memory controller 124 also de-asserts the mc_2ma_hold signal during cycle T6, thereby allowing memory write aligner 121 to operate in response to the applied input signals. Also during cycle T6, slave peripheral device 102 provides the next data value "IJKL" on system bus 105 as the sb_2si_d[31:0] signal, and DMA controller 101 provides the next address signal "A4" on system bus 105 as the sb_2si_a[31:2] signal.

At the rising edge of cycle T7, memory controller 124 is ready to perform a write operation to main memory 104, as indicated by the Ready state of the mc_2msi_ack signal. At this time, memory controller 124 receives a mwa_2mc_d[31:0] data signal of "xxxA" and a mwa_2mc_be[3:0] byte enable signal of "0001". In response, memory controller 124 causes data byte "A" to be written to byte location "11" of the address in main memory 104 specified by the address "A1". This write operation occurs during cycle T7.

Upon detecting the Ready state of the mc_2msi_ack signal at the rising edge of cycle T7, memory slave interface 120 provides the next address signal "A2" to memory controller 124 as the msi_2mc_a[31:2] signal.

Also during cycle T7, memory controller 124 issues a mc_2msi_ack signal that identifies a Wait state, and asserts the mc_2ma_hold signal, thereby causing the "ABCD" data value to be held in the internal register of memory write aligner 121. At this time, memory slave interface 120 provides a data signal msi_2mwa_d[31:0] of "EFGH", and a byte enable signal msi_2mwa_be[3:0] of "1111" to memory write aligner 121. In response, memory write aligner 121 provides an output data signal mwa_2mc_d[31:0] of "BCDE", and a byte enable signal mwa_2mc_be[3:0] of "1111" to memory controller 124.

Memory write aligner 121 remains in this state during cycles T7–T9 in response to the Wait states (mc_2msi_ack=Wait) provided by memory controller 124 existing during cycles T7 and T8. During cycle T9, memory controller 124 provides a mc_2msi_ack signal identifying a Ready state, and de-asserts the mc_2ma_hold signal. In response, memory controller 124 performs a write operation to main memory 124 at the rising edge of cycle T10. In this write operation, the mwa_2mc_d[31:0] signal of "BCDE" provided by memory write aligner 121 is written to address "A2" of main memory 124.

Upon detecting the Ready state of the mc_2msi_ack signal at the rising edge of cycle T10, memory slave interface 120 provides the next address signal "A3" to memory controller 124 as the msi_2mc_a[31:2] signal.

Processing continues in this manner, with data values "FGHI", "JKLM", "NOPQ", "RSTU", "VWXY" and "Zxxx" being written to main memory 104 at the rising edges of clock cycles T11, T13, T14, T15, T16, and T17, respectively.

It is important to note that at the end of the fly-by read transfer (i.e., during cycle T14), DMA controller 101 transmits the last address "A8" as the sb_2si_a[31:2] signal, together with a "0000" byte enable as the sb_2si_be[3:0] signal. This enables memory controller 124 to cause the last data value of the fly-by read transfer to be written to main memory 104 at the end of the fly-by read transfer. More specifically, this causes memory controller 124 to write data value "Zxxx" to byte location "00" of address "A8" in response to the rising edge of cycle T17.

Fly-By Write—(Slave Peripheral Device 102)

A fly-by write operation will now be described. In general, a fly-by write access is performed as follows. Slave peripheral device 102 begins a fly-by write operation by providing a write request (REQ) signal and a byte count (BYTE_COUNT) signal to DMA controller 101. The BYTE_COUNT signal identifies the number of bytes to be provided to slave peripheral device 102 during the fly-by write operation. DMA controller 101 uses the byte cont information to determine the size of the flyby transfer on system bus 105. DMA controller 101 subsequently provides a grant (GNT) signal back to slave device 102, thereby indicating that the fly-by write transfer may begin. When the fly-by write transfer begins, memory control device 103 will place fully aligned data and byte-enable signals on system bus 105.

After receiving an asserted GNT signal from DMA controller 101, slave peripheral 113 drives the sp_2pa_a[1:0] alignment signal to peripheral write aligner 112. This alignment signal identifies the byte location within FIFO 114 to which the first byte of the transfer will be aligned. The sp_2pa_a[1:0] alignment signal must be driven continuously with the same value until the fly-by write transfer is complete.

Eventually DMA controller 101 will start the fly-by write transfer across system bus 105. When this occurs, peripheral slave interface 110 will assert the psi_2sp_flyby_wr and psi_2sp_flybyBE_valid signals, indicating that valid data and byte-enables are being provided to slave device 102 on system bus 105. Slave peripheral 113 registers the data and byte-enable signals at the positive edge of the system clock signal. At this time, slave peripheral 113 also increments the write pointer of FIFO 114, except when the byte-enable signals="0000". In this case, slave peripheral 113 disregards the data and does not increment the write pointer of FIFO 114. Because the data and byte-enable signals are processed by peripheral write aligner 112 (to provide the pwa_2sp_d[31:0] and pwa_2sp_be[3:0] signals), the data and byte-enable signals are aligned to the proper byte location when registered by slave peripheral 113.

DMA controller 101 asserts the dma_2si_flyby_last signal to identify the transfer of the last word. In response, peripheral slave interface 110 asserts the psi_2sp_last_flybyBE signal, indicating to slave peripheral 113 that the last byte-enables are being passed.

During fly-by write operations, no explicit flushing of peripheral write aligner 112 in slave peripheral 102 is required. This flushing is automatically done by slave interface 110, which processes the byte enables on system bus 105 and the alignment signal sp_2pa_a[1:0] to determine if flushing is necessary. The method used to determine whether peripheral write aligner 112 must be flushed is provided below.

If ((sp_2pa_a[1:0]=01) & (last_flyby_BE=1111)) OR
If ((sp_2pa_a[1:0]=10) & (last_flyby_BE=1111 OR 1110)) OR
If ((sp_2pa_a[1:0]=11) & (last_flyby_BE=1111 OR 1110 or 1100))
then flush; else don't flush Slave interface 110 performs a required flush operation by automatically asserting the psi_2sp_flyby_wr, psi_2sp_flybyBE_valid, and psi_2sp_last_flyby_BE signals, and driving the psi_2pwa_be[3:0] signals to a value of "0000". This causes peripheral write aligner 112 to drive the last data and byte enables stored in its internal register (as the pwa_2sp_d[31:0] and pwa_2sp_be[3:0] signals), and further causes slave peripheral FIFO 114 to accept these last data and byte enables and adjust its pointers.

Slave peripheral 113 uses the byte-enables to determine the number of bytes transferred by DMA controller 101 and the new location of the write pointer of FIFO 114. Assuming that slave peripheral 113 incremented the write pointer of FIFO 114 each time the psi_2sp_flyby_wr signal was asserted by slave interface 110, (except when the byte-enables="0000"), the final location of the FIFO write pointer depends only on the last byte-enables passed to slave peripheral 113. If the last byte-enables passed to slave peripheral 113 were "1111", then the value of the FIFO write pointer must not change. However, if the last byte-enables passed to slave peripheral 113, had a value other than "1111", then the write pointer of FIFO 114 must be backed up by 1 (because the last word written to FIFO 114 was only a partial word).

Figure 11:
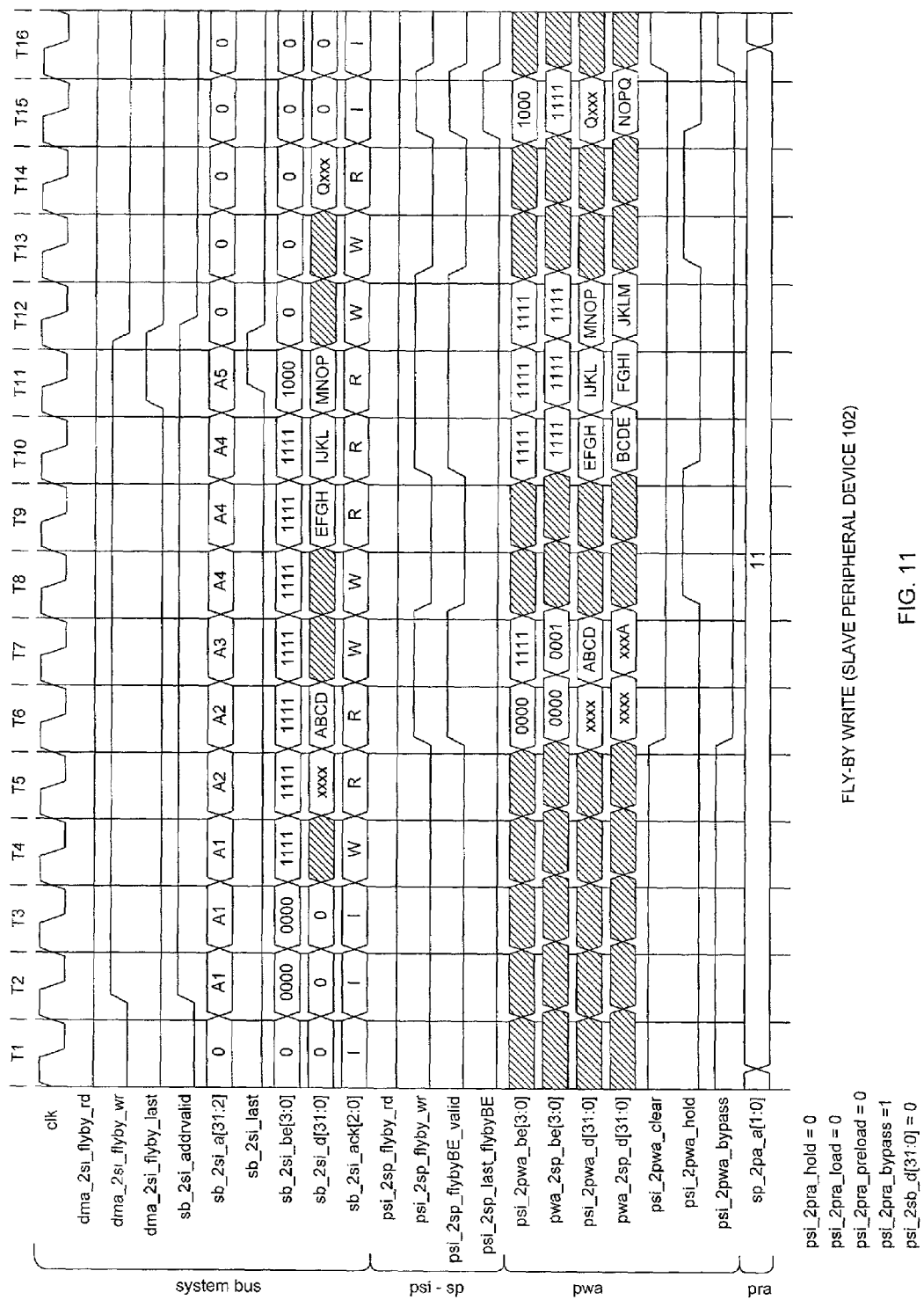
FIG. 11 is a waveform diagram that illustrates signals associated with the slave peripheral device of FIG. 7 during a fly-by write operation.

FIG. 11 is a waveform diagram that illustrates signals associated with slave device 102 during a particular fly-by write operation. In this fly-by write operation, 17 bytes (A–Q) are transferred, starting from byte location "01" in main memory 104 to byte location "11" in FIFO 114. FIGS. 12, 13 and 14 are block diagrams illustrating the contents of main memory 104, the address, data and byte-enable signals on system bus 105, and the data and byte enables received by slave peripheral 113, respectively.

As described in more detail below, memory read aligner 122 in memory control device 103 aligns the data from main memory 104 to system bus 105. The peripheral write aligner 112 in slave device 102 then aligns the data on system bus 105 to FIFO 114.

In the described example, the data read from main memory 104 is aligned from a higher byte location to a lower byte location (i.e., location "01" in main memory 104 to location "00" on system bus 105). As a result, memory read aligner 122 must hold partial bytes (e.g., bytes "ABC") in its internal register and wait for the rest of the bytes (e.g., byte "D") to arrive from main memory 104 before placing the first aligned data word on system bus 105. This situation implies that the first data word provided by memory read aligner 122 will be "garbage" data (i.e., data word "xxxx" of FIG. 13). Consequently, DMA controller 101 provides byte enables (i.e., sb_2si_be[3:0]) having a value of "0000" on system bus 105 that correspond with the garbage data provided on system bus 105. Note that the byte enables are driven on the system bus in advance of the corresponding data words in accordance with the bus protocol. This allows decoding to be performed prior to receiving the data word. In general, byte enable information is provided at least one ready state before the data. A Wait state on the system bus will result in the byte enables being ignored during the next cycle. For example, the Wait states detected at the rising edges of cycles T5, T8 and T9 will cause the byte enables (i.e., sb_2si_be[3:0]) to be ignored during cycles T6, T9 and T10, respectively.

The garbage data (xxxx) and the byte enables (0000) will eventually be passed to slave peripheral 113. When this happens, slave peripheral 113 ignores the garbage data and does not increment the write pointer of FIFO 114.

Note that if the fly-by write operation is aligned within main memory 104 (i.e., the sb_2si_a[1:0] alignment signal is equal to "00"), then there will be no garbage data, and DMA controller 101 issues a byte enable signal sb_2si_be[3:0] having a value of "1111".

Peripheral read aligner 111 is not involved with the fly-by write transfer of FIG. 11. To disable peripheral read aligner 111, the sp_pra_preload, psi_2pra_load and psi_2pra_hold signals are held at logic "0" values, and the psi_2pra_bypass signal is held at a logic "1" value.

During clock cycle T1, slave peripheral 113 provides a sp_2pa_a[1:0] alignment signal having a value of "11" to peripheral write aligner 112, thereby indicating the desired alignment of data words to FIFO 114. In general, this "11" alignment signal causes write aligner 112 to implement a "right shift by three" function, in the manner described above for generic transaction aligner 500. This alignment signal is maintained at a value of "11" throughout the fly-by write operation. Note that the psi_2pwa_bypass signal is asserted high at this time, thereby effectively disabling write aligner 112.

During clock cycle T2, DMA controller 101 asserts the dma_2si_flyby_wr signal, thereby indicating the start of a fly-by write operation. DMA controller 101 also asserts the sb_2si_addrvalid signal, thereby indicating that the addresses on system bus 105 are valid. At the rising edge of clock cycle T3, memory slave interface 120 detects the asserted dma_2si_flyby_wr and sb_2si_addrvalid signals and begins the access of main memory 104. During cycle T5, memory control device 103 provides the garbage data word "xxxx" (i.e., sb_2si_d[31:0]) on system bus 105. Also during cycle T5, memory control device 103 places a Ready state on system bus 105 (via the sb_2si_ack[2:0] signal). A detailed description of the operation of memory control device 103 is provided below in connection with FIG. 15

At the rising edge of clock cycle T6, peripheral slave interface 110 detects the Ready state on system bus 105. In response, peripheral slave interface 110 de-asserts the psi_2pwa_clear and psi_2pwa_bypass signals, thereby enabling peripheral write aligner 112. At this time, the byte-enable register in write aligner 112 stores a value of "0000" (because of the previously asserted psi_2pwa_clear signal). In addition, peripheral slave interface 110 asserts the psi_2sp_flyby_wr and psi_2sp_flybyBE_valid signals, thereby informing slave peripheral 113 that the fly-by write operation has begun.

Also at the rising edge of clock cycle T6, peripheral slave interface 110 provides the garbage data word "xxxx" and the corresponding byte enables "0000" to write aligner 112 (as the psi_2pwa_d[31:0] and psi_2pwa_be[3:0] signals, respectively). In response, write aligner 112 provides garbage data (pwa_2sp_d[31:0]) and a byte enable signal (pwa_2sp_be[3:0]) having a value of "0000" to slave peripheral 113. The "0000" byte enable signal prevents slave peripheral 113 from writing this garbage data to FIFO 114 at the rising edge of clock cycle T7.

At the rising edge of clock cycle T7, slave interface 110 detects a Ready state and a fully-aligned data word "ABCD" on system bus 105. Slave interface 110 passes the data word "ABCD" and the byte enable signal "1111" (previously provided during cycle T4) to write aligner 112. In response, write aligner 112 passes a shifted data word of "xxxA" and a byte enable signal of "0001" to slave peripheral 113. As a result, at the rising edge of clock cycle T8, slave peripheral 113 writes data byte "A" to byte location "11" in FIFO 114.

Also at the rising edge of clock cycle T8, the shifted data value "BCDA" and byte enable signal "1111" are stored in the internal register of peripheral write aligner 112. In addition, a Wait state is detected on system bus 105. In response, peripheral slave interface 110 de-asserts the psi_2sp_flyby_wr and psi_2sp_flybyBE_valid signals, and asserts the psi_2psw_hold signal, thereby suspending the fly-by write operation.

At the rising edge of cycle T10, slave interface 110 detects a Ready state along with data word "EFGH" on system bus 105. In response, peripheral slave interface 110 asserts the psi_2sp_flyby_wr and psi_2sp_flybyBE_valid signals, and de-asserts the psi_2psw_hold signal, thereby allowing the fly-by write operation to continue in slave device 102.

Slave interface 110 passes the data word "EFGH" and the byte enable signal "1111" (previously received during cycle T5) to write aligner 112. In response, write aligner 112 passes a shifted data word of "BCDE" and a byte enable signal of "1111" to slave peripheral 113. As a result, at the rising edge of clock cycle T11, slave peripheral 113 writes data word "BCDE" to FIFO 114. Also at the rising edge of clock cycle T11, the shifted data value "FGHE" and byte enable signal "1111" are stored in the internal register of peripheral write aligner 112.

At the rising edge of cycle T11, slave interface 110 detects a Ready state along with data word "IJKL" on system bus 105. Slave interface 110 passes the data word "IJKL" and the byte enable signal "1111" (previously provided during cycle T7) to write aligner 112. In response, write aligner 112 passes a shifted data word of "FGHI" and a byte enable signal of "1111" to slave peripheral 113. As a result, at the rising edge of clock cycle T12, slave peripheral 113 writes data word "FGHI" to FIFO 114. Also at the rising edge of clock cycle T12, the shifted data value "JKLI" and byte enable signal "1111" are stored in the internal register of peripheral write aligner 112.

At the rising edge of cycle T12, slave interface 110 detects a Ready state along with data word "MNOP" on system bus 105. Slave interface 110 passes the data word "MNOP" and the byte enable signal "1111" (previously provided during cycle T8) to write aligner 112. In response, write aligner 112 passes a shifted data word of "JKLM" and a byte enable signal of "1111" to slave peripheral 113. As a result, at the rising edge of clock cycle T13, slave peripheral 113 writes data word "JKLM" to FIFO 114. Also at the rising edge of clock cycle T13, the shifted data value "NOPM" and byte enable signal "1111" are stored in the internal register of peripheral write aligner 112.

Note that DMA controller 101 asserts a dma__2si_flyby_last signal, which is detected by slave interface 110 at the rising edge of clock cycle T12. This signal informs slave interface 110 that it has received the last valid byte enable signal of the fly-by write operation. At this time, slave interface 110 waits for the last data value of the fly-by write operation. This last data value is provided during clock cycle T14 (because of Wait states during cycles T12 and T13). At the rising edge of clock cycle T15, slave interface 110 detects the Ready state and the last data word "Qxxx". Slave interface 110 passes the data word "Qxxx" to write aligner 112. In response, write aligner 112 passes a shifted data word of "NOPQ" and a byte enable signal of "1111" to slave peripheral 113 (note that an associated byte enable signal of "1000" was provided during cycle T11). As a result, at the rising edge of clock cycle T16, slave peripheral 113 writes data word "NOPQ" to FIFO 114. Also, slave peripheral 113 detects the assertion of the psi_2sp_last_f-lybyBE signal, which completes the fly-by write operation.

Fly-By Write—(Memory Control Device 103)

The fly-by write operation will now be described with respect to memory control device 103. During the fly-by write operation, DMA controller 101 drives the two least significant bits of the first address in main memory 104 to be accessed during the fly-by write operation These two least significant bits are provided to memory slave interface 120 as the dma__2msi_a[1:0] alignment signal. This alignment signal, which remains unchanged through the entire fly-by write transfer, is registered by memory slave interface 120, and passed to memory aligners 121–122 as the msi__2ma_a[1:0] signal.

During a fly-by write operation, memory controller 124 accesses the desired data values in main memory 104, and transmits these data values to memory read aligner 122 as the mc__2mra_d[31:0] signal. These data values are processed (e.g., shifted) within memory read aligner 122 in response to the msi__2ma_a[1:0] alignment signal. The processed data values are provided to memory slave interface 120 as the mra__2msi_d[31:0] data signal. The msi__2mra_load signal is asserted high, such that the input data value mc__2mra_d[31:0] is latched in the internal register of memory read aligner 122 each clock cycle (unless memory controller 124 asserts the mc__2ma_hold signal).

Note that the msi__2mra_bypass signal is held at a logic low value, such that memory read aligner 122 is not bypassed. During CPU memory read operations, the msi__2mra_bypass signal is held at a logic high value, and data transfer occurs directly between memory controller 124 and memory slave interface 120, with memory read aligner 122 being effectively removed from the data path (i.e., bypassed).

Also note that the mc__2mra_preload signal is de-asserted low, as preloading is not possible for the memory read aligner 122 during a fly-by write operation. That is, memory controller 124 cannot preload data from main memory 104 into memory read aligner 122 before the transfer starts, because memory controller 124 does not receive instruction regarding which data to preload until DMA controller 101 places an address on system bus 105. As described above, DMA controller 101 issues byte enables of "0000" during the first cycle of a fly-by write operation if the data read from main memory 104 is unaligned with system bus 105, thereby compensating for the need to preload memory read aligner 122.

During a fly-by write transfer, memory controller 124 may issue Wait states to memory slave interface 120 via a mc__2msi_ack signal. When memory controller 124 issues a Wait state, memory controller 124 also asserts the hold signal to memory read aligner 122 (i.e., mc__2ma_hold), such that the data and byte enables stored in the internal register of memory read aligner 122 are preserved.

During fly-by write operations (and normal memory read operations), memory slave interface 120 asserts the msi__2mwa_bypass signal to memory write aligner 121, such that the msi__2mwa_be[3:0] byte enable signal driven by memory slave interface 120 (byte enables="1111" during all memory reads) are not modified by memory write aligner 121. Thus, the msi__2mwa_bypass signal follows the value of the read enable signal (msi__2mc_rd) driven by memory slave interface 120 during fly-by transfers.

Figure 15:
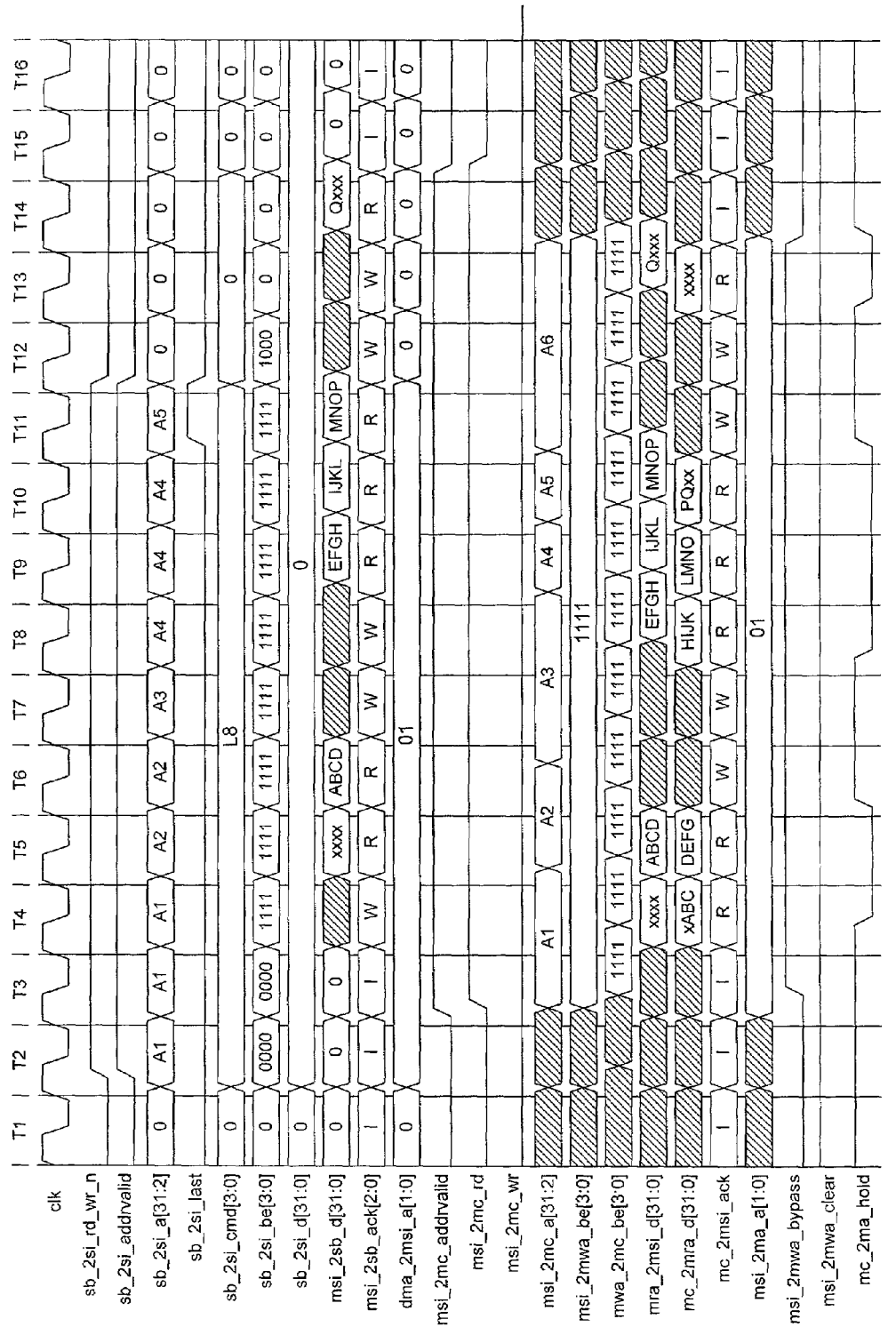
FIG. 15 is a waveform diagram illustrating signals associated with the memory control device of FIG. 9 during a fly-by write operation.

FIG. 15 is a waveform diagram illustrating signals associated with memory control device 103 during a fly-by write operation. This waveform diagram corresponds with the fly-by write operation illustrated in FIG. 11. Thus, many of the signals illustrated in FIG. 11 are also illustrated in FIG. 15. More specifically, FIG. 15 illustrates a particular fly-by write transfer from memory controller 124 through memory read aligner 122 and memory slave interface 120 onto system bus 105, while FIG. 11 illustrates the same fly-by write transfer from system bus 105, through peripheral slave interface 110 and peripheral write aligner 112, into slave peripheral 113. The following signals are common to FIGS. 11 and 15: clk, sb__2si_addrvalid, sb__2si_a[31:2], sb__2si_last, and sb__2si_be[3:0] the system bus signals).

The data provided by memory slave interface 120 on system bus 105 (i.e., msi__2sb_d[31:0]) is the same fly-by write data received by peripheral slave interface 110 on system bus 105 (i.e., psi__2sb_d[31:0]). (See, FIG. 11.)

The Idle, Ready and Wait states present on the system bus (i.e., the sb__2si_ack[2:0] signal in FIG. 11) are originated in memory control device 103, and are therefore provided from memory controller 124 to memory slave interface 120 as the mc__2msi_ack[1:0] signal, and from memory slave interface 120 to system bus 105 as the msi__2sb_ack[2:0] signal (FIG. 15).

The byte enable signal sb__2si_be[3:0] is provided by DMA controller 101 in the manner described above in connection with FIG. 11.

During cycle T2, the sb__2si_addrvalid signal provided by DMA controller 101 has a logic "1" value, the sb__2si_a [31:2] address signal provided by DMA controller 101 has the initial address value "A1", and the sb__2si_be[3:0] byte enable signal provided by DMA controller 101 has a value of "0000". These signals, which have been described above in connection with FIG. 11, are detected by memory slave interface 120 at the rising edge of cycle T3. Note that there is no fly-by signal going into memory slave interface 120. This is because memory controller 103 is a slave on system bus 105, and as such responds to bus transactions that fall in its address space. Memory slave interface 120 is not informed which bus master has started the bus transfer or which device is receiving the data on system bus 105. During a fly-by write transfer, DMA controller 101 starts the bus transfer into the address space of the memory control device 103, and the slave peripheral device 102 receives data from system bus 105.

Also during cycle T2, DMA controller 101 provides an alignment signal, dma__2msi_a[1:0], to memory slave interface 120. This alignment signal dma__2msi_a[1:0] identifies the alignment of the fly-by write data to be read from main memory 104. In the described example, the dma__2msi_a [1:0] signal has a value of "01", thereby indicating that the fly-by write data retrieved from main memory 104 is aligned with byte location "01" in main memory 104. The dma__ 2msi_a[1:0] signal remains at the same value during the fly-by write operation.

Also during cycle T2, DMA controller 101 provides a command signal (sb__2si_cmd[3:0]) having a value of "L8" and a read/write control signal (sb__2si_rd_wr_n) having a value of "1" to memory slave interface 120. These signals are detected by memory slave interface 120 at the rising edge of cycle T3. The "L8" value of the sb__2si_cmd[3:0] signal indicates that no more than 8 words will be transferred, and the "1" value of the sb__2si_rd_wr_n signal indicates that memory control device 103 is to read data from main memory 104, and place it on system bus 105.

The following also occurs in response to the rising edge of cycle T3. In response to the asserted sb__2si_addrvalid signal, memory slave interface 120 asserts a logic high msi__2mc_addrvalid signal to memory controller 124. In response to the asserted sb__2si_rd_wr_n signal, memory slave interface asserts a logic high msi__2mc_rd signal to memory controller 124. Memory slave interface 120 also routes the initial address value "A1" to memory controller 124 as the msi__2mc_a[31:2] address signal. At the rising edge of cycle T4, memory controller 124 detects these signals and begins decoding the initial address value "A1".

Also during cycle T3, memory slave interface 120 routes the dma__2msi_a[1:0] alignment signal (i.e., "01") to memory read aligner 122 as the msi__2ma_a[1:0] alignment signal. At the rising edge of cycle T4, memory read aligner 122 detects this alignment signal. As mentioned above, memory read aligner 122 will cause the incoming fly-by write data from main memory 104 to be re-aligned from byte location "01" to byte location "00" on system bus 105 in response to this "01" alignment signal.

During cycle T4, memory controller 124 provides the first fly-by write data value "xABC" to memory read aligner 122 as the mc__2mra_d[31:0] signal. In response, memory read aligner 122 routes a "don't care" data value "xxxx" to memory slave interface 120 as the mra__2msi_d[31:0]. As described above, this data value is a "don't care" value because the alignment is from a higher byte location ("01" in main memory 104) to a lower byte location ("00" on system bus 105). DMA controller 101 ensures that data value "xxxx" corresponds with a byte-enable value of "0000" on system bus 105.

Memory controller 124 de-asserts the mc__2ma_hold signal during cycle T4, thereby allowing memory read aligner 122 to operate in response to the applied input signals. Memory controller 124 also asserts a mc__2msi_ack signal having a Ready state during cycle T4.

During cycle T5, memory slave interface 120 provides the "don't care" data value "xxxx" on system bus 105 as the msi__2sb_d[31:0] signal, and the Ready state on system bus 105 as the msi__2sb_ack[2:0] signal.

Also during cycle T5, DMA controller 101 provides the sb__2si_a[31:2] address signal "A2", which is routed to memory controller as the msi__2mc_a[31:2] signal. In response, memory controller 124 causes a read operation to be performed to address A2 of main memory 104. Memory controller 124 provides the result of this read operation, data value "DEFG", to memory read aligner 122 as the mc__2mra_d[31:0] signal. In response, memory read aligner 122 provides the first aligned data value "ABCD", to memory slave interface 120 as the mra__2msi_d[31:0] signal.

Memory controller 124 also asserts a mc__2msi_ack signal having a Ready state during cycle T5.

During cycle T6, memory slave interface 120 provides the first aligned data value "ABCD" to system bus 105 as the msi__2sb_d[31:0] signal. Memory slave interface 120 also provides a msi__2sb_ack[2:0] signal having a Ready state on system bus 105 during cycle T6.

Also during cycle T6 (and during cycle T7), memory controller 124 issues a mc__2msi_ack signal having a Wait state to memory slave interface 120, and asserts the mc__2ms_hold signal, thereby causing memory read aligner 122 to hold its current state. Memory slave interface 120 provides the Wait states to system bus 105 during the next cycle T7 (and during cycle T8) as the msi__2sb_ack[2:0] signal. Fly-by write data values are therefore not provided to system bus 105 during cycles T7 and T8.

During cycle T7, DMA controller 101 provides a third fly-by write address A3 to memory slave interface 120 on system bus 105 as the sb__2si_a[31:2] signal. During cycle T8, memory controller 124 asserts a mc__2msi_ack signal having a Ready state. At this time, memory controller 124 causes a read operation to be performed to address A3 of main memory 104. Memory controller 124 provides the result of this read operation, data value "HIJK", to memory read aligner 122 as the mc__2mra_d[31:0] signal. In response, memory read aligner 122 provides the second aligned data value "EFGH", to memory slave interface 120 as the mra__2msi_d[31:0] signal. This data value "EFGH" is provided on system bus 105 during the next cycle T9.

Processing continues in this manner, with data values "LMNO" and "PQxx" being retrieved from main memory 104 during cycles T9 and T10, respectively, and data values "IJKL" and "MNOP" being provided to system bus 105 during cycles T10 and T11, respectively. Memory controller 124 provides additional Wait states during cycles T11 and T12. Memory controller 124 then provides a Ready state during cycle T13, at which time, memory read aligner 122 provides data value "Qxxx" to memory slave interface 120. During cycle T14, this data value "Qxxx" is provided to system bus 105 as the last data value of the fly-by write transfer.

Although the invention has been described in connection with several embodiments, it is understood that this invention is not limited to the embodiments disclosed, but is capable of various modifications that would be apparent to a person skilled in the art. Thus, the invention is limited only by the following claims.

The invention claimed is:

1. A system comprising:
a system bus;
a direct memory access (DMA) controller coupled to the system bus;
a memory control device coupled to the system bus and the DMA controller, the memory control device including a memory controller, a memory read aligner, a memory write aligner and a memory slave interface;
a main memory coupled to the memory control device; and
a slave device coupled to the system bus and the DMA controller, the slave device including a slave peripheral, a peripheral read aligner, a peripheral write aligner and a peripheral slave interface.

2. The system of claim 1, wherein the DMA controller is configured to implement fly-by read and fly-by write operations between the memory control device and the slave device.

3. The system of claim 2, wherein the memory read aligner is configured to provide data words that are fully aligned with the system bus during fly-by write operations.

4. The system of claim 2, wherein the peripheral read aligner is configured to provide data words that are fully aligned with the system bus during fly-by read operations.

5. The system of claim 2, wherein the memory write aligner is configured to process data words that are fully aligned with the system bus during fly-by read operations.

6. The system of claim 5, wherein the memory write aligner is further configured to re-align the data words on the system bus to a byte address of the main memory during fly-by read operations.

7. The system of claim 2, wherein the peripheral write aligner is configured to process data words that are fully aligned with the system bus during fly-by write operations.

8. The system of claim 7, wherein the peripheral write aligner is further configured to re-align the data words on the system bus to a byte address of the slave peripheral during fly-by write operations.

9. The system of claim 2, wherein the slave peripheral includes a first in, first out (FIFO) memory coupled to the peripheral read aligner and the peripheral write aligner.

10. The system of claim 9, wherein the slave device comprises means for adjusting a read pointer of the FIFO memory after a fly-by read operation.

11. The system of claim 9, wherein the slave peripheral further comprises means for informing the peripheral read aligner and the peripheral write aligner of an alignment offset between the system bus and the FIFO memory.

12. The system of claim 1, wherein each of the aligners include:
a barrel shifter coupled to receive a data word, a byte enable value and an alignment signal;
a register coupled to receive a data word and a byte enable value provided by the barrel shifter; and
an output multiplexer coupled to receive the data words and byte enable values provided by the barrel shifter and the register, the output multiplexer being controlled by the alignment signal.

13. The system of claim 12, wherein each register includes:
a data register for storing a data word provided by the barrel shifter;
a byte enable register for storing a byte enable value provided by the barrel shifter; and
means for clearing the byte enable register.

14. The system of claim 12, wherein each aligner further includes:
means for preloading the register with a data word and byte enable value provided by the barrel shifter;
means for loading the register with a data word and byte enable value provided by the barrel shifter;
means for preserving a data word and a byte enable value in the register; and
means for bypassing the barrel shifter and the register.

15. A method of performing a fly-by read operation, the method comprising the steps of:
reading data words from a memory device in a slave peripheral, wherein each of the data words includes N bytes;
incrementing a read pointer of the memory device each time a data word is read from the memory device;
aligning the data words read from the memory device to a system bus; and
adjusting the read pointer at the end of the fly-by read operation, wherein the adjusting is performed in response to the manner in which the data words read from the memory device are aligned to the system bus.

16. The method of claim 15, further comprising the step of providing byte enable signals on the system bus using a direct memory access (DMA) controller, the byte enable signals corresponding with bytes of the data words being transferred.

17. The method of claim 16, wherein the step of adjusting the read pointer comprises the steps of:
backing up the read pointer by one if the data words read from the memory device are initially aligned with the system bus and a last byte enable signal of the fly-by read operation indicates that all of the bytes of a last data word are valid; and
backing up the read pointer by two if the data words read from the memory device are initially aligned with the system bus and the last byte enable signal indicates that not all of the bytes of the last data word are valid.

18. The method of claim 16, wherein the step of adjusting the read pointer comprises the steps of:
backing up the read pointer by one if the data words read from the memory device must be shifted by one byte to become aligned with the system bus and a last byte enable signal of the fly-by read operation indicates that at least N−1 bytes of a last data word are valid; and
backing up the read pointer by two if the data words read from the memory device must be shifted by one byte to become aligned with the system bus and the last byte enable signal indicates less than N−1 bytes of the last data word are valid.

19. The method of claim 16, wherein the step of adjusting the read pointer comprises the steps of:
backing up the read pointer by one if the data words read from the memory device must be shifted by two bytes to become aligned with the system bus and a last byte enable signal of the fly-by read operation indicates that at least N−2 bytes of a last data word are valid; and backing up the read pointer by two if the data words read from the memory device must be shifted by two bytes to become aligned with the system bus and the last byte enable signal indicates that less then N−2 bytes of the last data word are valid.

20. The method of claim 16, wherein the step of adjusting the read pointer comprises the step of backing up the read pointer by one if the data words read from the memory device must be shifted by N−1 bytes to become aligned with the system bus.

21. The method of claim 16, further comprising the steps of:
providing an alignment signal on the system bus using the direct memory access (DMA) controller; and
re-aligning data words from the system bus to a byte location in a main memory in response to the alignment signal.

22. The method of claim 21, further comprising the step of providing a last address and a byte enable signal having a logic zero value using the DMA controller at the end of the fly-by read operation.

23. The method of claim 15, further comprising the step of operating the memory device in a first in, first out (FIFO) manner.

24. A method of performing a fly-by write operation between a memory device and a slave device on a system bus, the method comprising:
reading a first data word from the memory device, wherein the first data word is not aligned with the system bus, such that the first data word includes a first set of one or more bytes to be included in the fly-by write operation, and a second set of one or more bytes to be excluded from the fly-by write operation;
transmitting an invalid data word on the system bus to a slave device, wherein the invalid data word includes the second set of one or more bytes of the first data word;
transmitting a disabling byte-enable value on the system bus to the slave device, the disabling byte-enable value corresponding with the invalid data word;
preventing the invalid data word from being written to the slave device in response to the disabling byte-enable value.

25. The method of claim 24, further comprising providing the disabling byte-enable value with a direct memory access (DMA) controller.

26. The method of claim 25, further comprising:
providing a first address signal from the DMA controller to the memory device; and
retrieving the first data value from the memory device in response to first address signal.

27. The method of claim 24, further comprising:
reading a second data word from the memory device, wherein the second data word is not aligned with the system bus;
combining the first set of one or more bytes of the first data word with a first set of one or more bytes of the second data word to create a first fly-by write data word;
transmitting the first fly-by write data word on the system bus to the slave device;
transmitting a first byte-enable word on the system bus to the slave device, the first byte-enable word corresponding with the first fly-by write data word; and
writing the first fly-by write data word to the slave device in response to the first byte-enable word.

28. The method of claim 27, further comprising shifting the first fly-by write data word in the slave device in response to an alignment signal.

29. The method of claim 27, further comprising:
providing an alignment signal that identifies a degree of misalignment between the first data word and the system bus; and
combining the first set of one or more bytes of the first data word with a first set of one or more bytes of the second data word in response to the alignment signal.

30. The method of claim 29, further comprising providing the alignment signal to the memory device with a direct memory access (DMA) controller.

31. The method of claim 24, further comprising:
providing a Ready signal on the system bus when the memory device is in a Ready state; and
providing a Wait signal on the system bus when the memory device is in a Wait state.

32. The method of claim 24, further comprising the step of operating the slave device in a first in, first out (FIFO) manner.

33. A method of performing a fly-by read operation, the method comprising:
reading a first data word from a first memory device;
preloading the first data word into a read aligner; and then reading a second data word from the first memory device;
applying the second data word to the read aligner;
applying a first alignment signal to the read aligner;
creating a first fly-by read word by routing a first portion of the first data word and a first portion of the second data word through the read aligner in response to the first alignment signal; and
transmitting the first fly-by read word on a system bus to a write aligner.

34. The method of claim 33, further comprising:
loading the second data word into the read aligner after the first fly-by read word is transmitted to the system bus;
reading a third data word from the first memory device;
applying the third data word to the read aligner;
creating a second fly-by read word by routing a second portion of the second data word and a first portion of the third data word through the read aligner in response to the first alignment signal; and
transmitting the second fly-by read word on a system bus to the write aligner.

35. The method of claim 33, further comprising:
applying a second alignment signal to the write aligner; and
routing a first portion of the first fly-by read word through the write aligner in response to the second alignment signal;
providing a first byte-enable signal in response to the second alignment signal;
applying the first portion of the first fly-by read word and the first byte-enable signal to a second memory device; and
writing the first portion of the first fly-by read word to the second memory device, wherein the first byte enable signal enables the first portion of the first fly-by read word to be written to the second memory device.

36. The method of claim 35, further comprising:
providing a Ready signal on the system bus when the second memory device is in a Ready state; and
providing a Wait signal on the system bus when the second memory device is in a Wait state.

* * * * *